United States Patent
Mochizuki et al.

(10) Patent No.: US 6,650,253 B2
(45) Date of Patent: Nov. 18, 2003

(54) MAP DISPLAY DEVICE, MAP DISPLAY METHOD, AND COMPUTER PROGRAM FOR USE IN MAP DISPLAY DEVICE

(75) Inventors: Yoshiyuki Mochizuki, Suita (JP); Keiichi Senda, Takarazuka (JP); Kenji Nishimura, Nabari (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 253 days.

(21) Appl. No.: 09/867,112

(22) Filed: May 29, 2001

(65) Prior Publication Data

US 2001/0048377 A1 Dec. 6, 2001

(30) Foreign Application Priority Data

May 30, 2000 (JP) ........................................ 2000-160032

(51) Int. Cl.[7] .............................................. G08G 1/123
(52) U.S. Cl. .............................. 340/995.1; 340/995.15; 340/995.17; 340/995.28; 701/212
(58) Field of Search ................... 340/995.1, 995.14, 340/995.15, 995.17, 995.26, 995.28; 701/200, 212

(56) References Cited

U.S. PATENT DOCUMENTS

| 5,874,905 A | * | 2/1999 | Nanba et al. ............... 340/995 |
| 5,913,918 A | * | 6/1999 | Nakano et al. ............. 701/208 |
| 6,169,516 B1 | | 1/2001 | Watanabe et al. ...... 342/357.13 |
| 6,282,490 B1 | * | 8/2001 | Nimura et al. ............. 701/208 |

FOREIGN PATENT DOCUMENTS

JP          10207356          8/1998

* cited by examiner

*Primary Examiner*—Toan Pham

(57) ABSTRACT

In a map display device, a surface storing unit stores surface information which defines a curved surface having a form that depends on positions of portions of a map which are to be enlarged and/or contracted. A mapping unit maps the map onto the curved surface defined by the surface information. A projecting/displaying unit projects the mapped map onto a flat virtual screen, and displays the projected image. Here, by defining the curved surface so that each part of the curved surface forms an intended angle with a line of sight in the projection, the image is displayed with desired portions enlarged and/or contracted, while maintaining connections of roads. The same effect can also be achieved by projecting the map onto a virtual screen having the form of the curved surface.

24 Claims, 34 Drawing Sheets

FIG. 3

| CHARACTER STRING | CHARACTER POSITION |
|---|---|
| R512 | (300, 300) |
| SHRINE A | (400, 400) |
| CASTLE B | (750, 100) |

111

$x^2+(y-0.5)^2+(z+1)^2=1.25$ $x^2+(y-0.5)^2+(z-1)^2=1.25$

CAR POSITIONAL INFORMATION

FIG. 15

ALTITUDE TABLE

| POSITION | ALTITUDE |
|----------|----------|
| (100, 100) | 290 |
| (100, 200) | 300 |

121

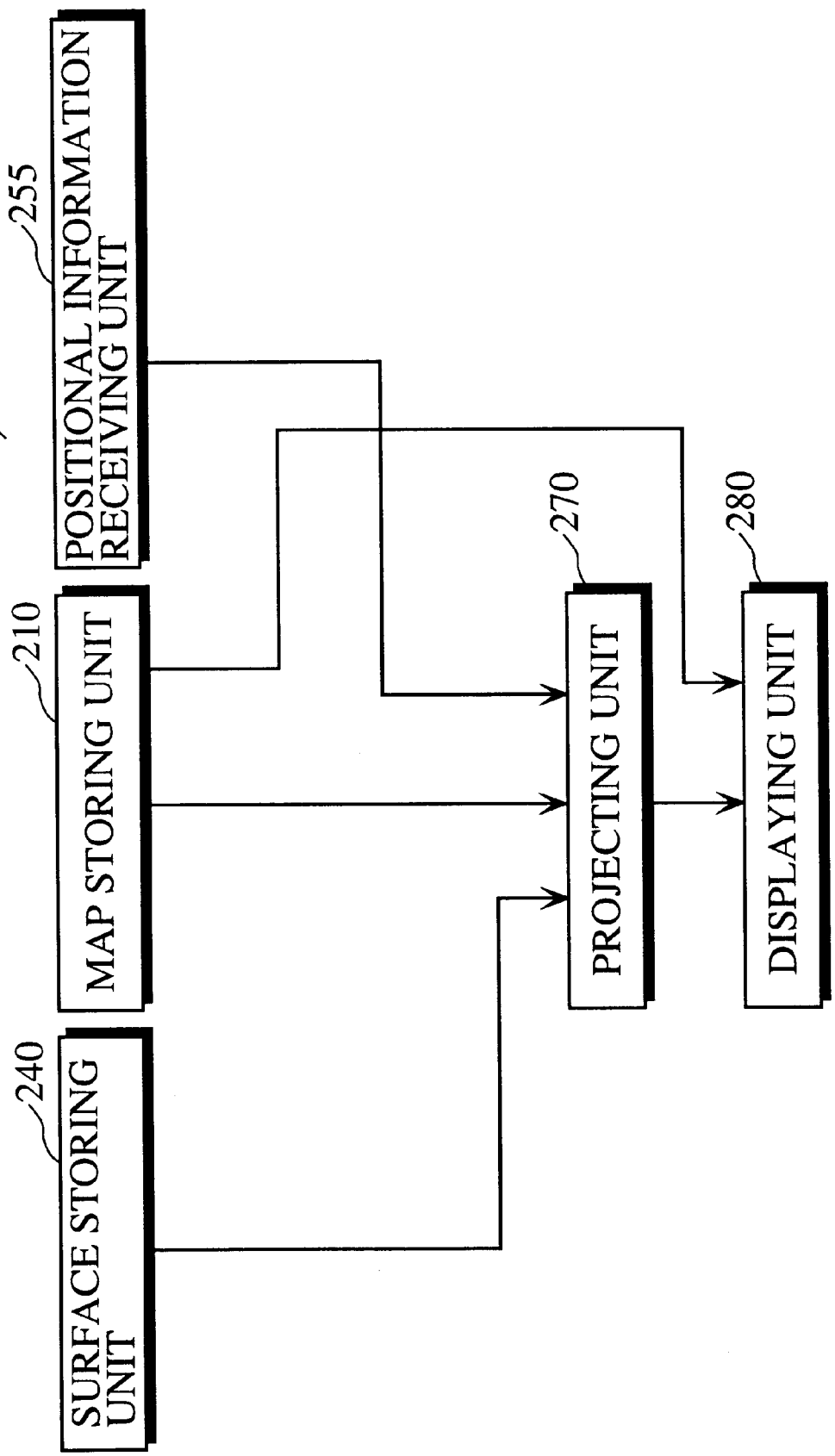

MAP DISPLAY DEVICE, MAP DISPLAY METHOD, AND COMPUTER PROGRAM FOR USE IN MAP DISPLAY DEVICE

This application is based on application No. 2000-160032 filed in Japan, the content of which is hereby incorporated by reference.

BACKGROUND OF THE INVENTION (1) Field of the Invention

The present invention relates to a map display device, a map display method, and a computer program for use in a map display device, and in particular relates to road map display techniques used in car navigation devices.

(2) Related Art

Example applications for map display devices include a car navigation device. A map display device used in a car navigation device needs to enable the user, such as the driver, to comprehend a displayed map at a glance. Hence various map display techniques have been devised so that the driver can understand information at once. One of such techniques is a method of displaying with emphasis on information which is likely to be desired by the driver.

When driving a car, there are some points to which the driver seems to pay particular attention, such as an intersection and a destination location. Such points are hereinafter called "points of interest". A conventional type of map display device displays an enlarged view of a point of interest and its vicinity. For example, when a car is approaching a main intersection, this type of map display device displays an enlarged view of the intersection and its vicinity, to help the driver judge which route he or she should take. Here, some map display devices display the enlarged view over a part of a map which is being displayed on a screen, rather than displaying the enlarged view on the whole screen.

Also, there are map display devices that display, over a part of a map which is being displayed on a screen, a wide area view of the periphery of an area covered by the map on a larger scale. This method allows the driver to consult the map, and at the same time consult the wide area view to check which roads run around the area covered by the map.

Thus, conventional map display devices emphasize information which is likely to be desired by the driver, by displaying an enlarged view of the vicinity of a point of interest or a wide area view of the periphery of an area shown by a map. In this way, the driver can quickly comprehend information displayed on the screen.

However, when displaying the enlarged view of the vicinity of the point of interest on the whole screen, the driver can view the enlarged view but cannot view the map of the area outside the vicinity of the point of interest, and therefore cannot check the roads existing around the vicinity of the point of interest.

Also, when displaying the enlarged view of the vicinity of the point of interest or the wide area view of the periphery of the area covered by the map on part of the screen, the driver cannot view the part of the map which is concealed by this display. Besides, there is no continuity between the map and the enlarged or wide area view whose scale is different with the map. This makes it difficult for the driver to quickly comprehend the relation between the two maps, in particular connections of roads between the two maps.

There is also a conventional technique of displaying a map using the law of perspective. This method displays distant objects to be small and close objects to be large in accordance with human visual characteristics, thereby helping the driver view the map in the right perspective. However, when displaying the vicinity of a point of interest in enlarged view or displaying the periphery of an area in wide area view, this technique has the same problem as above.

SUMMARY OF THE INVENTION

The present invention has an object of providing a map display device that enables a driver to accurately and quickly comprehend map information displayed on a display screen.

(1) The stated object can be achieved by a map display device that is characterized by mapping a map of an area which is specified by a current position of the map display device or by an instruction from a user, onto a curved surface to generate a mapped image, and displaying the mapped image.

With this construction, the map display device can display a map with one or more portions enlarged and/or contracted, while maintaining connections of roads. For instance, it is possible to enlarge a map portion the detailed information of which is likely to be desired by the driver, and at the same time contract a map portion of the periphery of the map so that the periphery is displayed in wide area view. As a result, the connections of the roads are maintained, and the driver can accurately and quickly comprehend the map information displayed on the display screen.

(2) Here, in the map display device of (1), the map has at least one portion which is to be enlarged and/or at least one portion which is to be contracted, the portion to be enlarged and the portion to be contracted being referred to as an enlarged portion and a contracted portion respectively, and the curved surface has a form which depends on a positioning of the enlarged portion and/or the contracted portion on the map.

With this construction, the map display device produces the same effect as (1).

(3) Here, the map display device of (2) includes: a map storing unit for storing map information; a map acquiring unit for acquiring map information that shows the map of the area specified by the current position of the map display device, from the map storing unit; a surface storing unit for storing surface information that defines the curved surface whose form depends on the positioning of the enlarged portion and/or the contracted portion on the map shown by the acquired map information; a mapping unit for mapping the map shown by the acquired map information, onto the curved surface defined by the surface information, to generate the mapped image; and a projecting/displaying unit for projecting the mapped image onto a flat virtual screen, and displaying the projected image.

With this construction, the map display device produces the same effect as (1).

(4) Here, in the map display device of (3), the curved surface defined by the surface information has the following property: when the map is mapped onto the curved surface by the mapping unit and projected onto the virtual screen by the projecting/displaying unit, (a) an angle formed between a part of the curved surface to which the enlarged portion of the map is mapped and a line of sight directed to the part of the curved surface in the projection is larger than any angles formed between other parts of the curved surface and lines of sight directed to the other parts of the curved surface in the projection, and (b) an angle formed between a part of the curved surface to which the contracted portion of the map is mapped and a line of sight directed to the part of the curved surface in the projection is smaller than any angles formed between other parts of the curved surface and lines of sight directed to the other parts of the curved surface in the projection.

With this construction, the map display device produces the same effect as (1).

(5) Here, the map display device of (4) further includes an altitude storing unit for storing altitude information showing a correspondence between positions of points shown in the map and altitudes of the points, wherein the mapping unit includes a surface deforming unit for providing undulations corresponding to the altitudes shown by the altitude information, to the curved surface at positions to which the points on the map at the corresponding positions shown by the altitude information are to be mapped, to generate a deformed curved surface, and the mapping unit maps the map onto the deformed curved surface.

With this construction, the map display device displays the map of three-dimensional appearance relating to the altitudes, so that the map which delivers the same degree of realism as the view when looking at the actual terrain from the sky can be presented to the driver. Accordingly, in addition to the effect of (1), the driver's understanding of the terrain is facilitated.

(6) Here, in the map display device of (5), the surface deforming unit includes an altitude changing unit for changing altitudes in the altitude information that correspond to positions included in a first area which is made up of the current position of the map display device in the map and a neighborhood thereof, to a uniform value, and the surface deforming unit generates the deformed curved surface, using the changed altitude information.

With this construction, the map display device displays the vicinity of the car position flatly and the other area three-dimensionally. Accordingly, in addition to the effect of (5), the display of the vicinity of the car position is kept from being obstructed by the undulations.

(7) Here, in the map display device of (6), the altitude changing unit further changes altitudes in the altitude information that correspond to positions included in an area around the first area, in accordance with distances of the positions from the first area.

With this construction, the map display device displays the boundary area between the flatly displayed area and the three-dimensionally displayed area so that the flat area and the three-dimensional area show continuity. Accordingly, in addition to the effect of (6), unnaturalness in visuality is reduced.

(8) Here, the map display device of (3) further includes a surface receiving unit for receiving the surface information, wherein the surface storing unit stores the surface information received by the surface receiving unit.

With this construction, when a position of a point of interest changes in a complex manner as the car moves, a surface calculating device provided outside the map display device calculates surface information for enlarging and/or contracting desired portions of the map and supplies it to the map display device. As a result, the load of computation is distributed over the two devices, and the map display is performed more smoothly.

(9) Here, in the map display device of (3), the projecting/displaying unit includes a projection position storing unit for storing a correspondence between positions on the curved surface and positions on the virtual screen to which points at the positions on the curved surface are to be projected.

With this construction, the map display device calculates and stores projection positions on the virtual screen in advance. This makes it unnecessary to calculate the projection positions which requires large computational complexity, for each projection operation. As a result, the map display speed is improved.

(10) Here, in the map display device of (3), the map information stored in the map storing unit includes (a) image information showing an image in which graphics representative of objects are drawn in correspondence with positions of the objects on the ground surface, and (b) character information showing a correspondence between character strings relating to the objects and the positions of the objects on the ground surface, the map acquiring unit acquires image information and character information which relate to the map of the area specified by the current position of the map display device, from the map storing unit, the map display device further includes a character display position calculating unit for calculating points on the curved surface to which points on the map at positions shown by the acquired character information are mapped, and calculating positions on the virtual screen to which the calculated points on the curved surface are projected, the mapping unit maps an image shown by the acquired image information to generate the mapped image, and the projecting/displaying unit further displays character strings shown by the acquired character information with reference to the calculated positions.

With this construction, the map display device does not subject the character fonts to mapping and perspective projection, but directly displays the character fonts at the position on the display screen corresponding to the character position. As a result, the deformation of the character fonts which may occur due to mapping and perspective projection is avoided, and the character viewability is increased.

(11) Here, the map display device of (3) is mounted on a movable body, and further includes a positional information receiving unit for receiving positional information showing a current position and a traveling direction of the movable body, wherein the map acquiring unit acquires the map information showing the map of the area specified by the positional information received by the positional information receiving unit, from the map storing unit.

With this construction, when the map display device is mounted on a movable body and used, a map of an appropriate area is displayed in accordance with the current position and traveling direction of the movable body.

(12) Here, the map display device of (11) further includes a map receiving unit for receiving map information transmitted by radio, wherein the map storing unit stores the map information received by the map receiving unit.

With this construction, the map display device displays latest map information transmitted by radio. Accordingly, a map that contains information on latest road conditions such as the closure and opening of roads can be presented to the driver.

(13) Here, the map display device of (2) includes: a map storing unit for storing map information; a map acquiring unit for acquiring map information that shows the map of the area specified by the current position of the map display device, from the map storing unit; a surface storing unit for storing surface information that defines a virtual screen having the form of the curved surface which depends on the positioning of the enlarged portion and/or the contracted portion on the map shown by the acquired map information; and a projecting/displaying unit for projecting the map shown by the acquired map information onto the virtual screen defined by the surface information, and displaying a projected image obtained as a result of the projection.

With this construction, the map display device produces the same effect as (1).

(14) Here, in the map display device of (13), the virtual screen defined by the surface information has the following property: when the map is projected onto the virtual screen by the projecting/displaying unit, (a) an angle formed between a part of the virtual screen to which the enlarged portion of the map is projected and a line of sight directed to the part of the virtual screen in the projection is smaller than any angles formed between other parts of the virtual screen and lines of sight directed to the other parts of the virtual screen in the projection, and (b) an angle formed between a part of the virtual screen to which the contracted portion of the map is projected and a line of sight directed to the part of the virtual screen in the projection is larger than any angles formed between other parts of the virtual screen and lines of sight directed to the other parts of the virtual screen in the projection.

With this construction, the map display device produces the same effect as (1).

(15) Here, the map display device of (14) further includes an altitude storing unit for storing altitude information showing a correspondence between positions of points shown in the map and altitudes of the points, wherein the projecting/displaying unit includes a map deforming unit for providing undulations corresponding to the altitudes shown by the altitude information, to the map at the corresponding positions shown by the altitude information, to generate a deformed map, and the projecting/displaying unit projects the deformed map onto the virtual screen.

With this construction, the map display device displays the map of three-dimensional appearance relating to the altitudes, so that the map which delivers the same degree of realism as the view when looking at the actual terrain from the sky can be presented to the driver. Accordingly, in addition to the effect of (1), the driver's understanding of the terrain is facilitated.

(16) Here, in the map display device of (15), the map deforming unit includes an altitude changing unit for changing altitudes in the altitude information that correspond to positions included in a first area which is made up of the current position of the map display device in the map and a neighborhood thereof, to a uniform value, and the map deforming unit generates the deformed map, using the changed altitude information.

With this construction, the map display device displays the vicinity of the car position flatly and the other area three-dimensionally. Accordingly, in addition to the effect of (15), the display of the vicinity of the car position is kept from being obstructed by the undulations.

(17) Here, in the map display device of (16), the altitude changing unit further changes altitudes in the altitude information that correspond to positions included in an area around the first area, in accordance with distances of the positions from the first area.

With this construction, the map display device displays the boundary area between the flatly displayed area and the three-dimensionally displayed area so that the flat area and the three-dimensional area show continuity. Accordingly, in addition to the effect of (16), unnaturalness in visuality is reduced.

(18) Here, the map display device of (13) further includes a surface receiving unit for receiving the surface information, wherein the surface storing unit stores the surface information received by the surface receiving unit.

With this construction, when a position of a point of interest changes in a complex manner as the car moves, a surface calculating device provided outside the map display device calculates surface information for enlarging and/or contracting desired portions of the map and supplies it to the map display device. As a result, the load of computation is distributed over the two devices, and the map display is performed more smoothly.

(19) Here, in the map display device of (13), the projecting/displaying unit includes a projection position storing unit for storing a correspondence between positions on the map and positions on the virtual screen to which points at the positions on the map are to be projected.

With this construction, the map display device calculates and stores projection positions on the virtual screen in advance. This makes it unnecessary to calculate the projection positions which requires large computational complexity, for each projection operation. As a result, the map display speed is improved.

(20) Here, in the map display device of (13), the map information stored in the map storing unit includes (a) image information showing an image in which graphics representative of objects are drawn in correspondence with positions of the objects on the ground surface, and (b) character information showing a correspondence between character strings relating to the objects and the positions of the objects on the ground surface, the map acquiring unit acquires image information and character information which relate to the map of the area specified by the current position of the map display device, from the map storing unit, the map display device further includes a character display position calculating unit for calculating positions on the virtual screen to which points on the map at positions shown by the acquired character information are to be projected, and the projecting/displaying unit projects an image shown by the acquired image information to generate the projected image, and displays character strings shown by the acquired character information with reference to the calculated positions.

With this construction, the map display device does not subject the character fonts to mapping and perspective projection, but directly displays the character fonts at the position on the display screen corresponding to the character position. As a result, the deformation of the character fonts which may occur due to mapping and perspective projection is avoided, and the character viewability is increased.

(21) Here, the map display device of (13) is mounted on a movable body, and further includes a positional information receiving unit for receiving positional information showing a current position and a traveling direction of the movable body, wherein the map acquiring unit acquires the map information showing the map of the area specified by the positional information received by the positional information receiving means, from the map storing unit.

With this construction, when the map display device is mounted on a movable body and used, a map of an appropriate area is displayed in accordance with the current position and traveling direction of the movable body.

(22) Here, the map display device of (21) further includes a map receiving unit for receiving map information transmitted by radio, wherein the map storing unit stores the map information received by the map receiving unit.

With this construction, the map display device displays latest map information transmitted by radio. Accordingly, a map that contains information on latest road conditions such as the closure and opening of roads can be presented to the driver.

(23) The stated object can also be achieved by a map display method for use in a map display device for displaying a map with one or more portions enlarged and/or contracted, including: a map receiving step for receiving map information that shows a map of an area specified by a current position of the map display device, wherein surface information that defines a curved surface whose form depends on a positioning of one or more portions to be enlarged and/or contracted on the map shown by the map information is stored in a storing unit in the map display device; a mapping step for mapping the map shown by the map information, onto the curved surface defined by the surface information, to generate a mapped image; and a projecting/displaying step for projecting the mapped image onto a flat virtual screen, and displaying the projected image.

With this construction, the map display operation that has the same effect as (1) can be performed.

(24) The stated object can also be achieved by a map display method for use in a map display device for displaying a map with one or more portions enlarged and/or contracted, including: a map receiving step for receiving map information that shows a map of an area specified by a current position of the map display device, wherein surface information that defines a virtual screen having a form of a curved surface which depends on a positioning of one or more portions to be enlarged and/or contracted on the map shown by the map information is stored in a storing unit in the map display device; and a projecting/displaying step for projecting the map shown by the map information onto the virtual screen defined by the surface information, and displaying a projected image obtained as a result of the projection.

With this construction, the map display operation that has the same effect as (1) can be performed.

(25) The stated object can also be achieved by a computer program recorded on a computer-readable recording medium, for use in a map display device that displays a map with one or more portions enlarged and/or contracted, the program including: a map receiving step for receiving map information that shows a map of an area specified by a current position of the map display device, wherein surface information that defines a curved surface whose form depends on a positioning of one or more portions to be enlarged and/or contracted on the map shown by the map information is stored in a storing unit in the map display device; a mapping step for mapping the map shown by the map information, onto the curved surface defined by the surface information, to generate a mapped image; and a projecting/displaying step for projecting the mapped image onto a flat virtual screen, and displaying the projected image.

With this construction, the map display operation that has the same effect as (1) can be executed on computer.

(26) The stated object can also be achieved by a computer program recorded on a computer-readable recording medium, for use in a map display device that displays a map with one or more portions enlarged and/or contracted, the program including: a map receiving step for receiving map information that shows a map of an area specified by a current position of the map display device, wherein surface information that defines a virtual screen having a form of a curved surface which depends on a positioning of one or more portions to be enlarged and/or contracted on the map shown by the map information is stored in a storing unit in the map display device; and a projecting/displaying step for projecting the map shown by the map information onto the virtual screen defined by the surface information, and displaying a projected image obtained as a result of the projection.

With this construction, the map display operation that has the same effect as (1) can be executed on computer.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIG. 3 shows an example of character information stored in the map storing unit;

FIG. 15 shows an example of altitude information stored in an altitude storing unit shown in FIG. 14;

FIG. 25 is a block diagram showing a map display device according to the fourth embodiment of the invention;

DESCRIPTION OF THE PREFERRED EMBODIMENT(S)

First Embodiment

The following is a description of a map display device to which the first embodiment of the invention relates. The map display device 10 is a device that maps map information on a curved surface having an intended form, perspective-projects the mapped map information, and displays an image obtained as a result of the projection. In so doing, a map is displayed with a desired portion enlarged or contracted, while maintaining connections of roads.

(Overall Construction)

Figure 1:
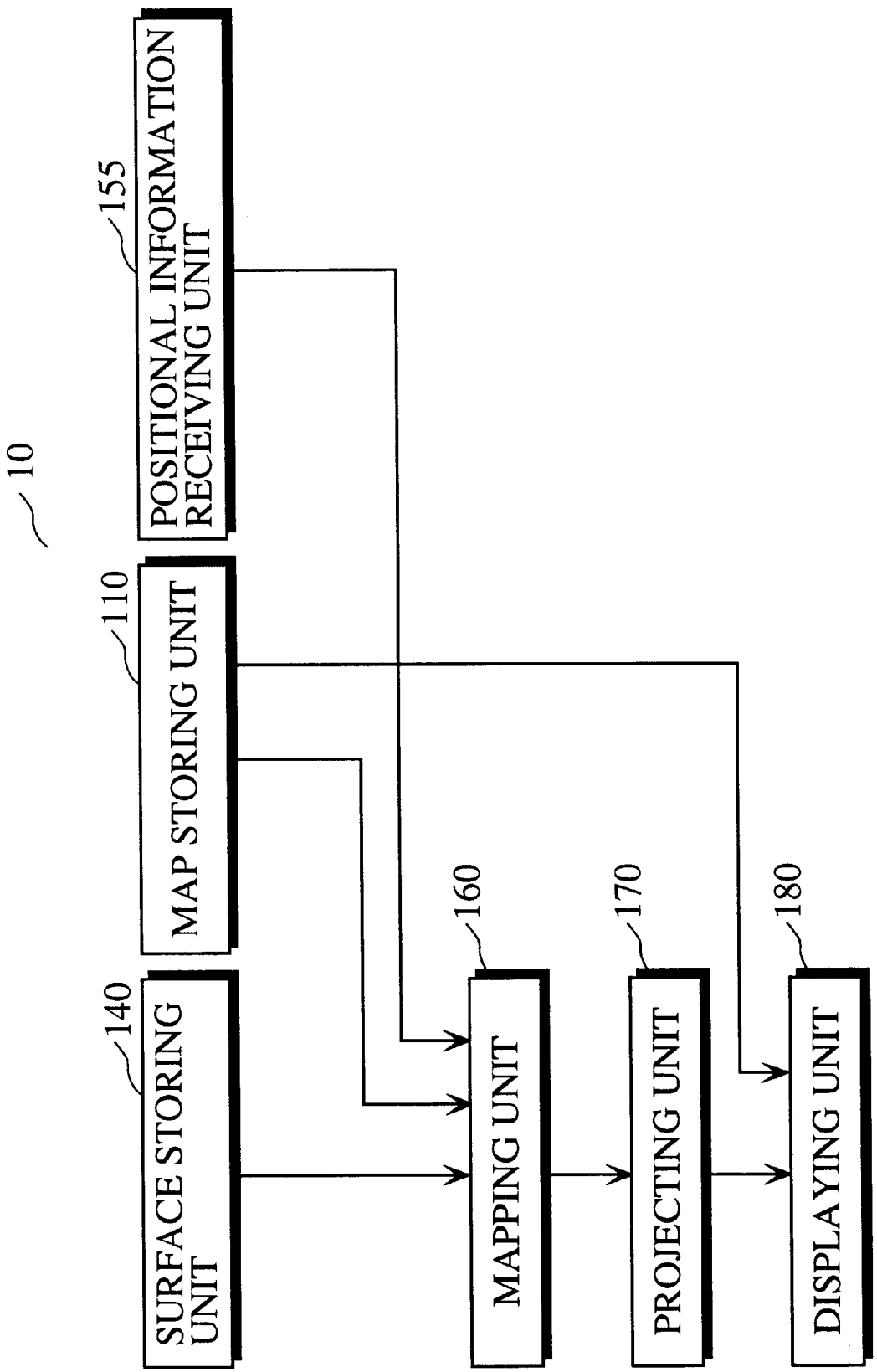
FIG. 1 is a block diagram showing a map display device according to the first embodiment of the invention.

As shown in FIG. 1, the map display device 10 includes a map storing unit 110, a surface storing unit 140, a positional information receiving unit 155, a mapping unit 160, a projecting unit 170, and a displaying unit 180.

The map display device 10 is implemented by software and hardware provided with a processor, a ROM (Read Only Memory) storing a program, and a working RAM (Random Access Memory). The function of each construction element is realized whereby the processor executes the program stored in the ROM. Also, the data transfer between the construction elements is conducted via the hardware such as the RAM.

(Map Storing Unit 110)

The map storing unit 110 stores map information which is made up of image information expressed in bitmap data and character information that includes character strings and designations about the positions of the character strings. Here, each character position and each pixel position are expressed using coordinates in a two-dimensional orthogonal coordinate system which covers the entire map information, with such a coordinate system being hereafter referred to as "st coordinate system".

Figure 2:
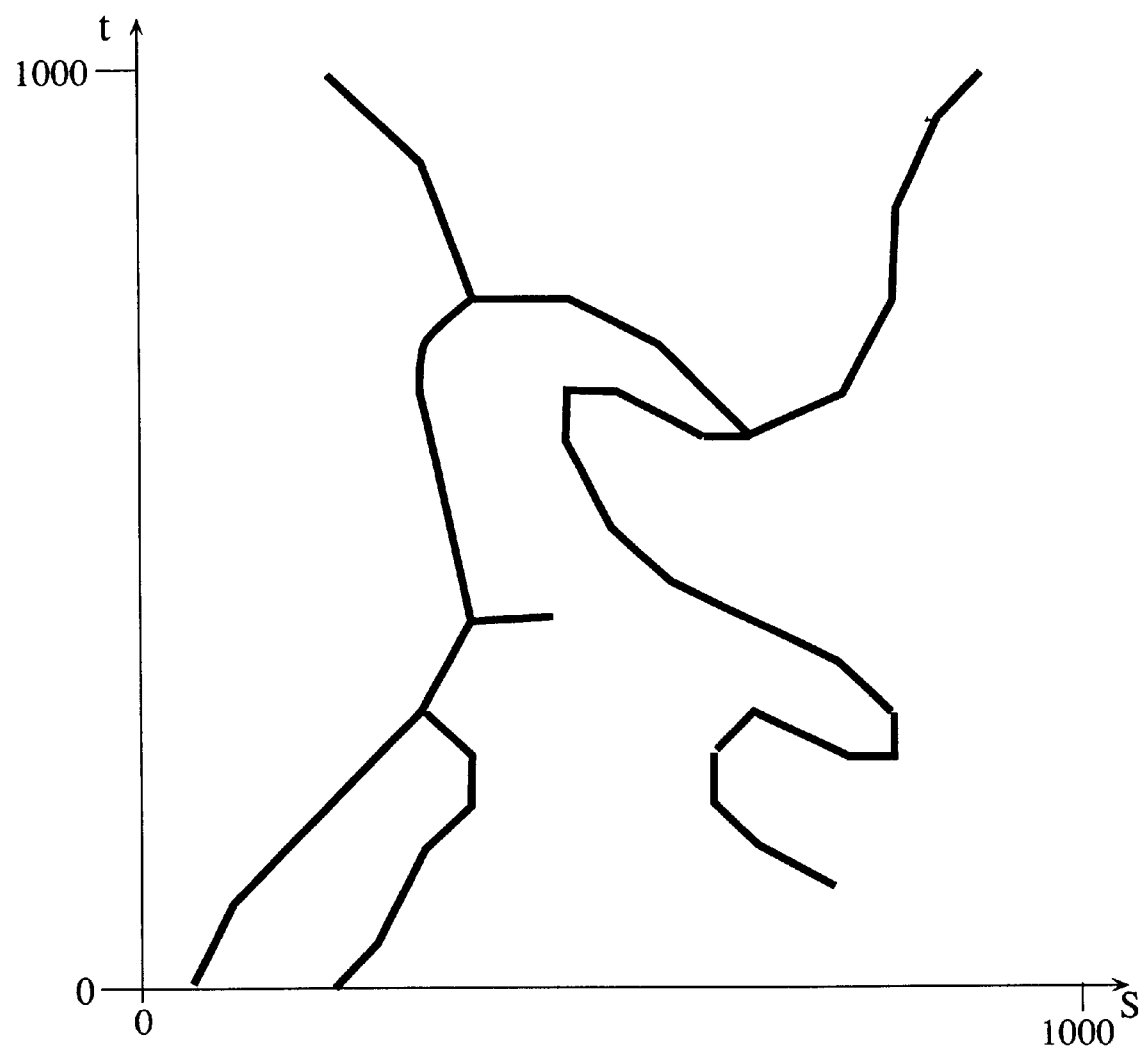
FIG. 2 shows an example of image information stored in a map storing unit shown in FIG. 1.

FIG. 2 shows an example of the image information stored in the map storing unit 110. The drawing covers the range of $0 \leq s \leq 1000$ and $0 \leq t \leq 1000$.

FIG. 3 shows an example of the character information stored in the map storing unit 110. Reference numeral 111 is a character information table which lists character strings and positions of the character strings.

(Surface Storing Unit 140)

The surface storing unit 140 stores surface information that defines a curved surface which exists in a virtual space where perspective projection is performed (hereafter simply referred to as "virtual space"), and onto which the image information is to be mapped. Here, the virtual space is represented by a three-dimensional orthogonal coordinate system which is referred to as "xyz coordinate system" in this specification.

The curved surface defined by the surface information in the surface storing unit 140 is designed so that an angle between a part of the curved surface to which a map portion to be enlarged is mapped and a line of sight in perspective projection is larger than any angles between the other parts of the curved surface and lines of sight in the perspective projection, and an angle between a part of the curved surface to which a map portion to be contracted is mapped and a line of sight in perspective projection is smaller than any angles between the other parts of the curved surface and lines of sight in the perspective projection. The effect achieved by this form is detailed in the description of the projecting unit 170.

The surface storing unit 140 stores the surface information defining the curved surface, in one of the following forms.

(1) A curved surface expressed by a relationship equation of x, y, and z.

(2) A curved surface obtained by interpolating a plurality of sample points on the surface.

(3) A curved surface obtained by expressing the x, y, and z coordinates of a point on the surface using parameters u and v.

Figure 4A:
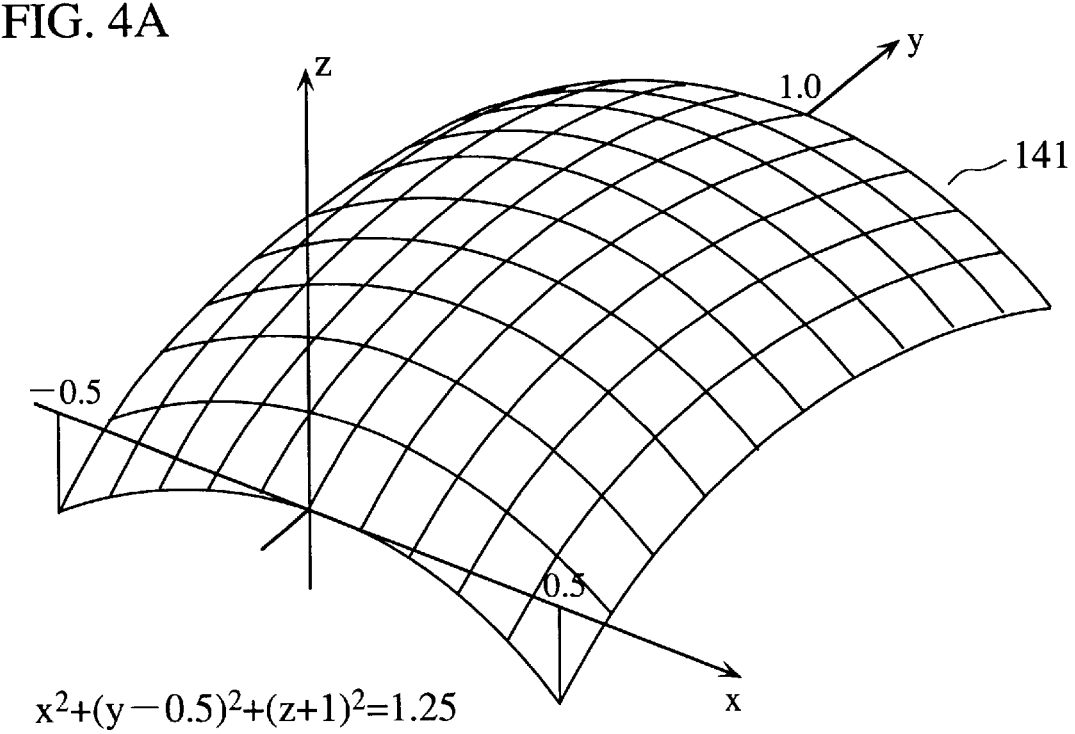
FIG. 4 shows example curved surfaces stored in a surface storing unit shown in FIG. 1.
Figure 4B:
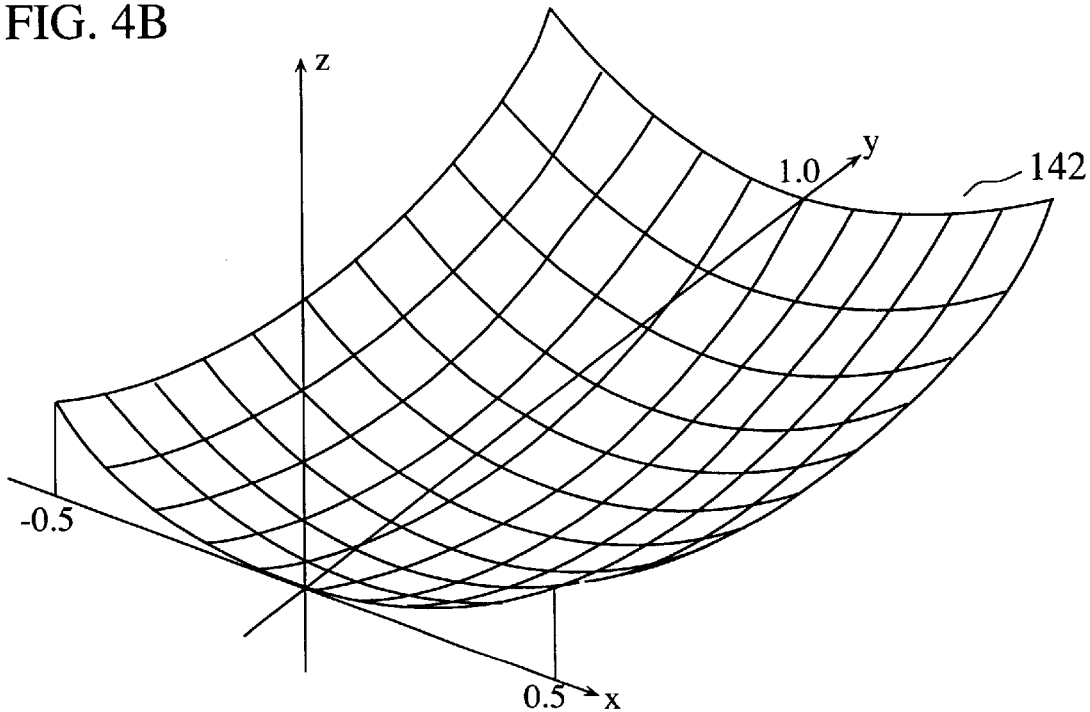

FIGS. 4A and 4B each show an example curved surface defined by the surface information stored in the surface storing unit 140. FIG. 4A shows a curved surface 141 expressed by a relationship equation $$x^2+(y-0.5)^2+(z+1)^2=1.25$$

whereas FIG. 4B shows a curved surface 142 expressed by a relationship equation $$x^2+(y-0.5)^2+(z-1)^2=1.25$$

each for the range of $-0.5 \leq x \leq 0.5$ and $0 \leq y < 1$. To facilitate the understanding of the form of each curved surface, geodesic lines are provided in 0.1 intervals for both of the x and y coordinates. Note that a curved surface in a virtual space can be similarly defined through the use of the above form (2) or (3) (not illustrated).

(Positional Information Receiving Unit 155)

The positional information receiving unit 155 receives car positional information relating to the current position and traveling direction of a car in which the map display device 10 is equipped, from an outside GPS (Global Positioning System) device or inertial navigation device. The positional information receiving unit 155 then outputs the car positional information to the mapping unit 160.

Figure 5:
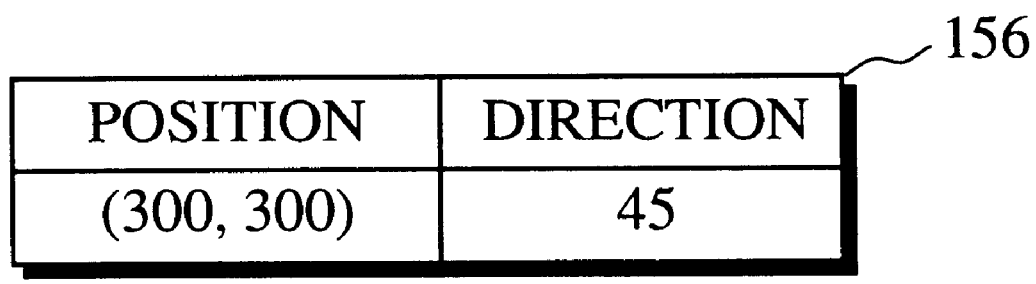
FIG. 5 shows an example of car positional information outputted from a positional information receiving unit to a mapping unit shown in FIG. 1.

FIG. 5 shows an example of the car positional information. Car positional information 156 is made up of information on the current position and traveling direction of the car. The car position is expressed by coordinates in the st coordinate system, and the traveling direction is expressed by an angle measured from the s axis counterclockwise.

(Mapping Unit 160)

The mapping unit 160 receives the car positional information from the positional information receiving unit 155, calculates an area which is subjected to map display (hereafter called "display target area") in accordance with the received car positional information, and maps image information included in the calculated display target area onto the curved surface defined by the surface information stored in the surface storing unit 140. The details are explained below.

The mapping unit 160 calculates a rectangular area which contains the current position of the car, as the display target area. As an example, the mapping unit 160 calculates an area having a range of 9 km ahead of the car position, 1 km to the rear, and 5 km to both the left and the right.

Figure 6:
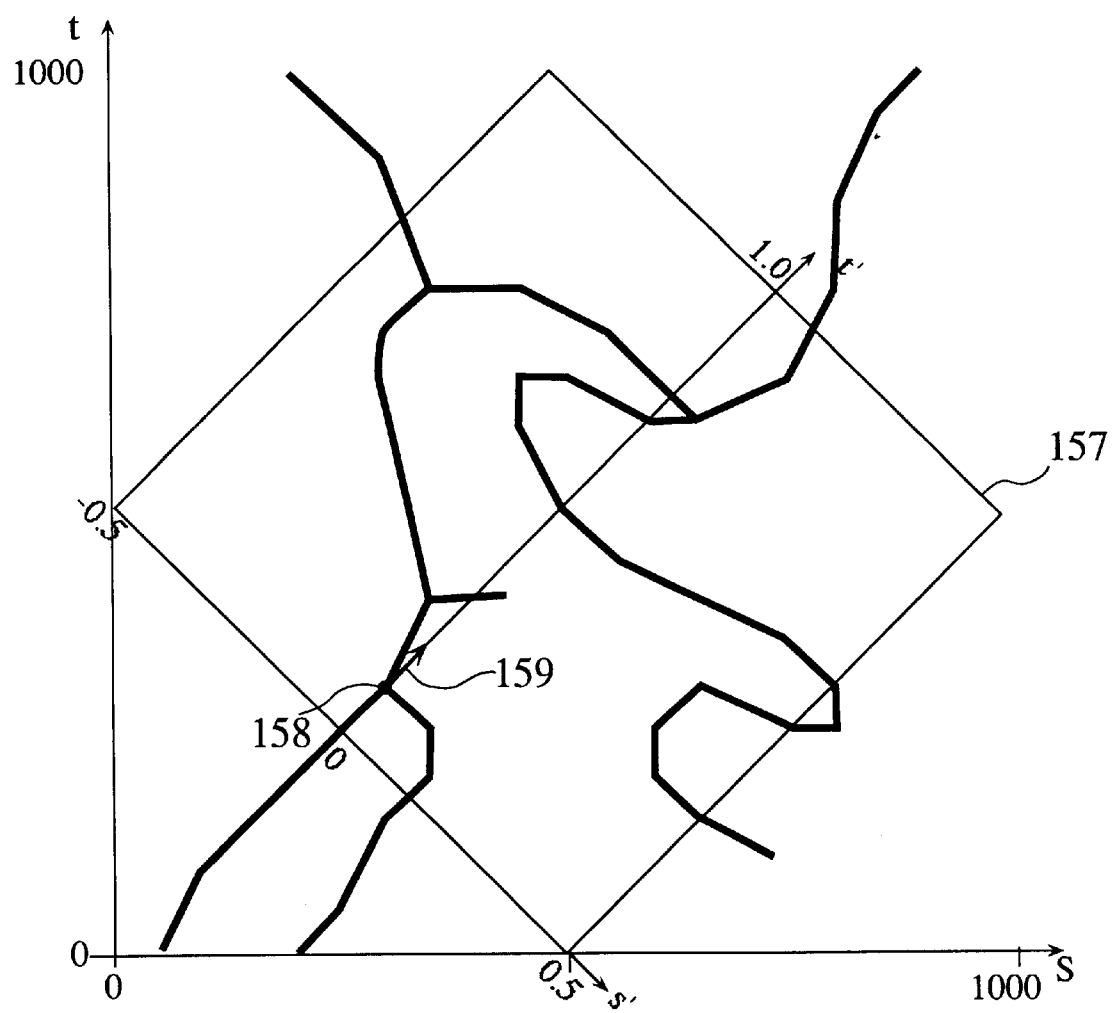
FIG. 6 is a conceptual view for explaining a mapping range of a map according to car positional information.

FIG. 6 shows the area calculated by the mapping unit 160. In the drawing, reference numeral 157 is the display target area, 158 the car position, and 159 the traveling direction.

The mapping unit 160 then finds a coordinate transformation which corresponds the st coordinates of the display target area to the xy coordinates of the virtual space. This transformation is composed of parallel translation and rotation according to the car position and the traveling direction, and contraction. The mapping unit 160 calculates the transformation f, based on the amount of parallel translation and the amount of rotation in accordance with the car position and the traveling direction, and the ratio of contraction.

Next, the mapping unit 160 calculates, for each pixel of the image information included in the display target area, a point (f(s0,t0),z0) on the curved surface to which a pixel at a pixel position (s0,t0) is to be mapped, in the following way.
(1) When the curved surface is defined by a relationship equation of x, y, and z, assign f (s0, t0) to x and y of the relationship equation and find z0.
(2) When the curved surface is defined by a plurality of sample points on the curved surface, bilinear interpolate the coordinates of sample points which are in the vicinity of f(s0,t0) with respect to the x and y coordinates, and obtain z0.
(3) When the x, y, and z coordinates of a point on the curved surface are defined using the parameters u and v, assign f(s0,t0) to x and y to find u0 and v0, and obtain z0 from u0 and v0.

The mapping unit 160 maps each pixel of the image information to the obtained position (f(s0,t0),z0) on the curved surface. The mapping is conducted using conventional texture mapping.

Here, a mapping method that depends on an area contribution ratio and a mapping method that interpolates pixels using bilinear interpolation or the like, which are conventionally used for anti-aliasing, may be applied to the mapping by the mapping unit 160.

Figure 7:
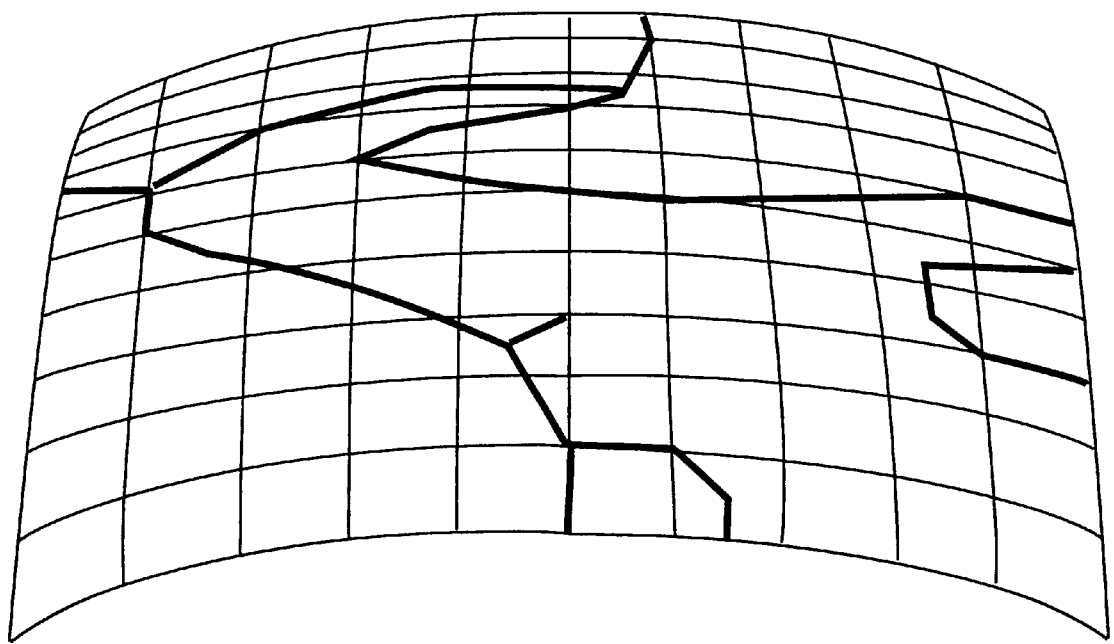
FIG. 7 shows an example of image information mapped by the mapping unit.
Figure 8:
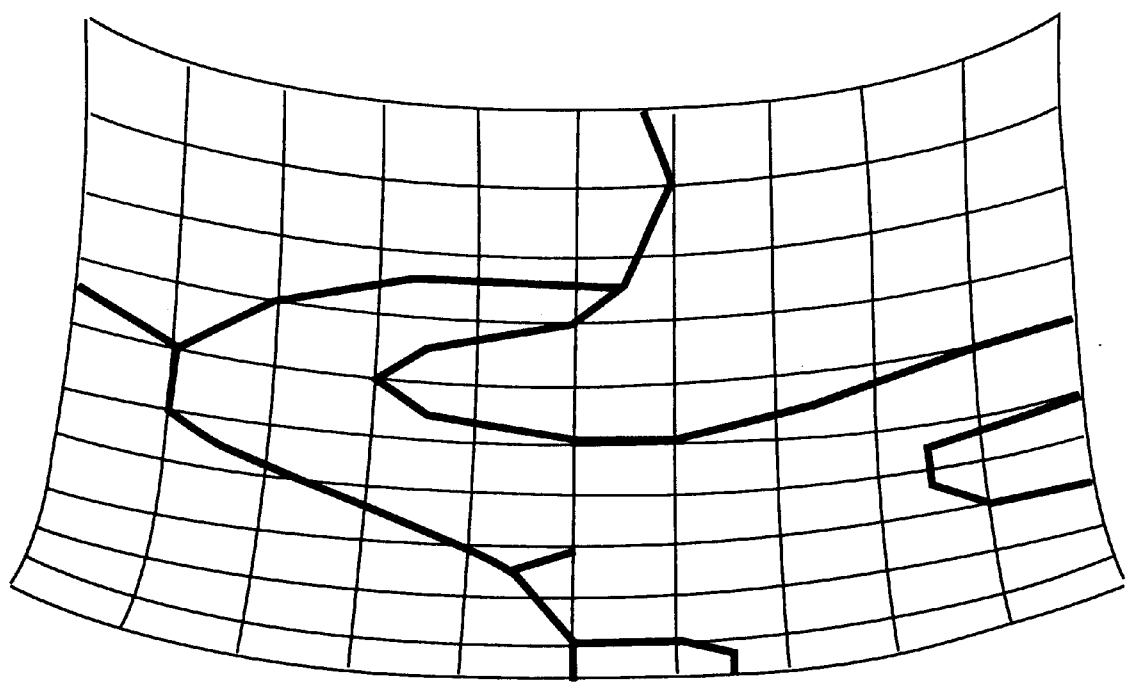
FIG. 8 shows an example of image information mapped by the mapping unit.

FIG. 7 shows the result of mapping the image information included in the area 157 shown in FIG. 6, onto the curved surface 141 shown in FIG. 4A. FIG. 8 shows the result of mapping the same image information onto the curved surface 142 shown in FIG. 4B. For better understanding of the forms, geodesic lines are shown in both FIGS. 7 and 8.
(Projecting Unit 170)

The projecting unit 170 perspective-projects the image information mapped by the mapping unit 160, onto a flat virtual screen. The details are explained below.

Figure 9A:
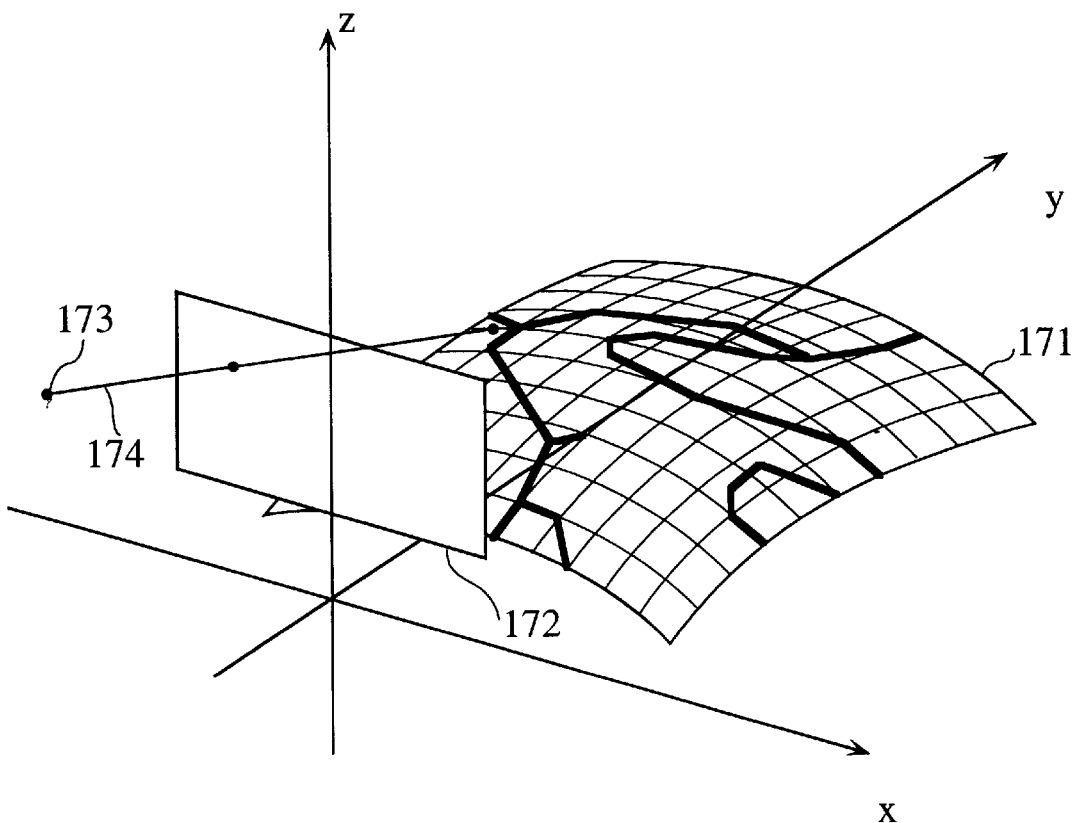
FIG. 9A is a conceptual view for explaining projection performed by a projecting unit shown in FIG. 1.

FIG. 9A is a conceptual view showing the perspective projection performed by the projecting unit 170 for the mapping result of FIG. 7, where the positional relations between a curved surface 171, a virtual screen 172, an eyepoint 173, and a line of sight 174 are shown. In the same way as the conventional map display using the low of perspective, the projecting unit 170 virtually positions the eyepoint 173 before the curved surface 171 in the traveling direction at an appropriate height, and positions the virtual screen 172 so as to provide appropriate vision. This being so, an image projected on the virtual screen 172 is analogous to a view when looking at an actual geographic area from the sky. This provides a realistic map to the driver, and helps the driver comprehend the perspective.

Figure 9B:
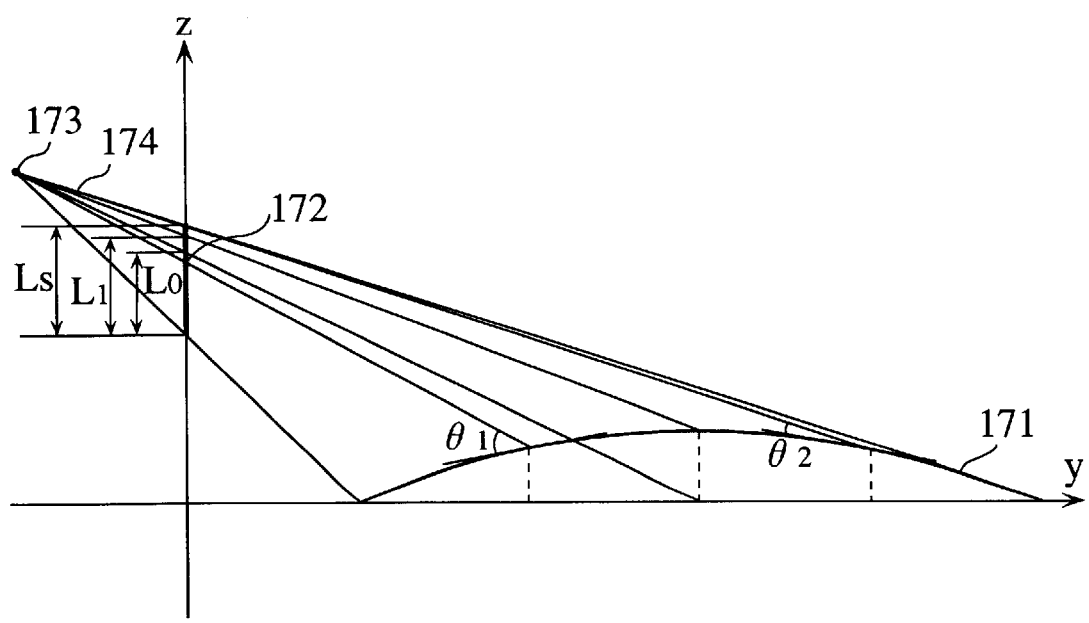
FIG. 9B is a sectional view of FIG. 9A where x=0.

FIG. 9B is a sectional view of FIG. 9A where x=0. In the drawing, Ls denotes the height of the virtual screen 172, and L1 denotes the length at which the nearer half of the curved surface 171 in the traveling direction is projected onto the virtual screen 172. Also, to compare with the conventional map display, the length at which the nearer half of a flat surface which has the same range as the curved surface 171 in x and y coordinates is projected on the virtual screen 172 is shown by L0.

As illustrated, a nearer part of the curved surface 171 in the traveling direction intersects a line of sight at a large angle $\theta 1$, while a farther part of the curved surface 171 in the traveling direction intersects a line of sight at a small angle $\theta 2$. Regarding a same-size part of the curved surface, the smaller an angle between the part of the curved surface and the line of sight, the smaller an area at which the part of the curved surface is projected onto the virtual screen. Accordingly, in the image obtained as a result of perspective-projecting the map mapped on the curved surface 171, near-by areas are enlarged while distant areas are contracted. This is also demonstrated by L0<L1.

Figure 10A:
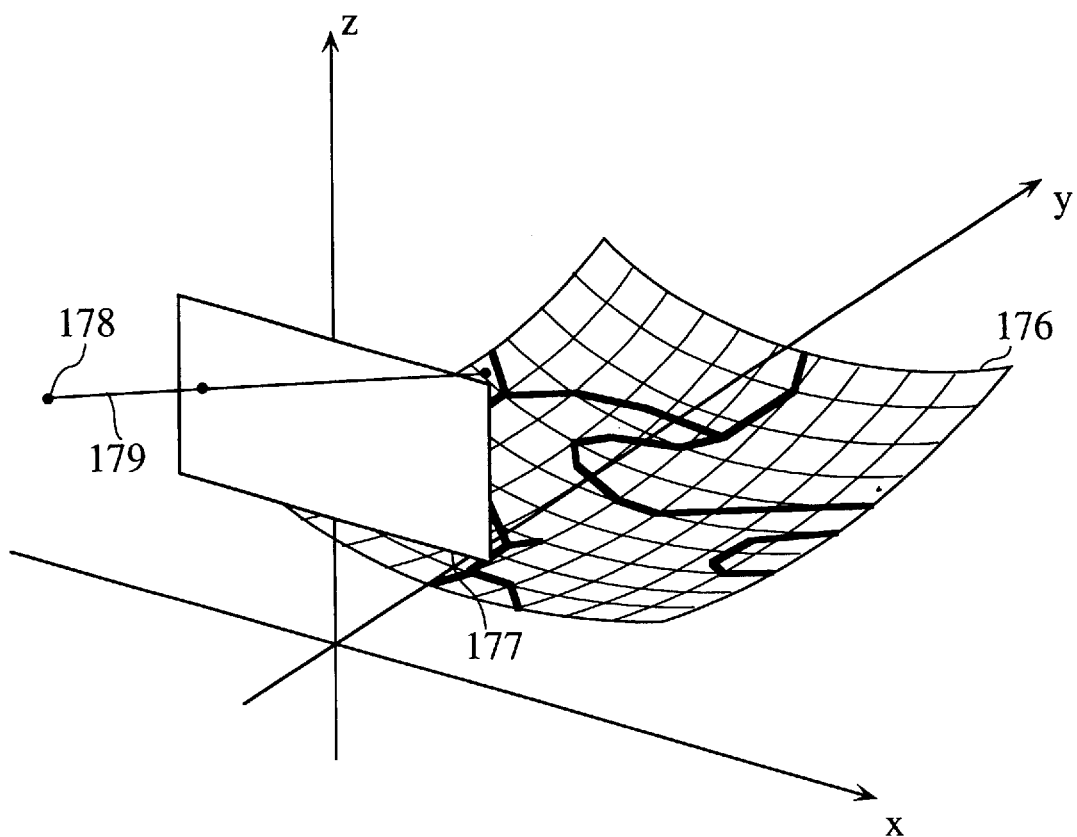
FIG. 10A is a conceptual view for explaining projection performed by the projecting unit.

FIG. 10A is a conceptual view showing the perspective projection which is performed by the projecting unit 170 for the mapping result of FIG. 8. In the drawing, reference numeral 176 is a curved surface, 177 a virtual screen, 178 an eyepoint, and 179 a line of sight. Their positioning and the effects achieved by it are as described above.

Figure 10B:
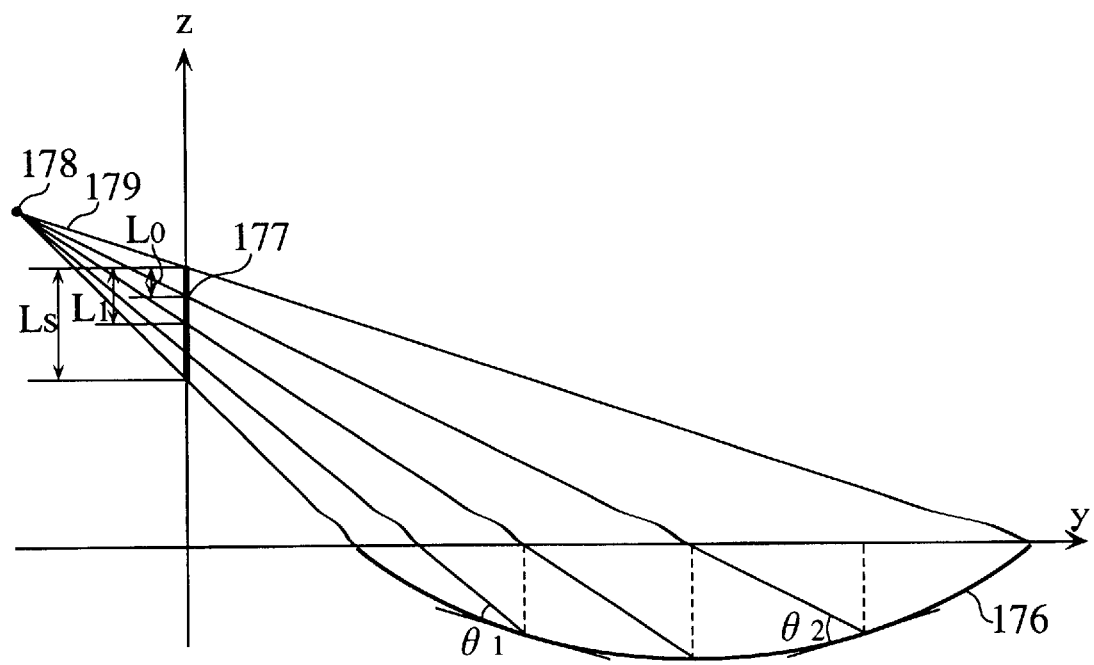
FIG. 10B is a sectional view of FIG. 10A where x=0.

FIG. 10B is a sectional view of FIG. 10A where x=0. In the drawing, Ls denotes the height of the virtual screen 177, L1 denotes the length at which the farther half of the curved surface 176 in the traveling direction is projected on the virtual screen 177, and L0 denotes the length at which the farther half of a flat surface having the same range as the curved surface 176 in x and y coordinates is projected on the virtual screen 177.

As illustrated, a nearer part of the curved surface 176 in the traveling direction intersects a line of sight at a small angle $\theta 1$, while a farther part of the curved surface 176 in the traveling direction intersects a line of sight at a large angle $\theta 2$. Accordingly, in the image obtained by perspective-projecting the map mapped on the curved surface 176, near-by areas are contracted while distant areas are enlarged. This is also demonstrated by L0<L1.

Thus, the curved surface is designed so that the angle between the part of the curved surface to which the map portion to be enlarged is mapped and the line of sight in perspective projection is larger than the angles between the other parts of the curved surface and the lines of sight, and the angle between the part of the curved surface to which the map portion to be contracted is mapped and the line of sight in perspective projection is smaller than the angles between the other parts of the curved surface and the lines of sight. By mapping image information onto such a curved surface and perspective-projecting it, an image is produced with a desired portion enlarged or contracted, while maintaining connections of roads.
(Displaying Unit 180)

The displaying unit 180 is equipped with a display screen realized by a liquid crystal panel, a cathode-ray tube, a plasma panel, an EL (electroluminescence) panel, or similar. The displaying unit 180 displays the character information and the image which is perspective-projected by the projecting unit 170, onto the display screen. The details are explained below.

The displaying unit 180 enlarges or contracts the image perspective-projected on the virtual screen, and displays it on the whole display screen.

The displaying unit 180 then calculates a point (f(s0,t0), z0) on the curved surface corresponding to a position (s0,t0) of each character string included in the display target area, in the same way as the mapping unit 160. The displaying unit 180 further calculates a point on the virtual screen to which the point (f(s0, t0),z0) on the curved surface is perspective-projected, and displays character fonts of the character string, centering on a point on the display screen corresponding to the calculated point on the virtual screen.

Thus, the map display device 10 does not subject the character fonts to mapping and perspective projection, when displaying the character information. The displaying unit 180 displays the character fonts at the position on the display screen determined in the above way, so as to prevent the character fonts from becoming deformed by mapping and perspective projection.

Figure 11:
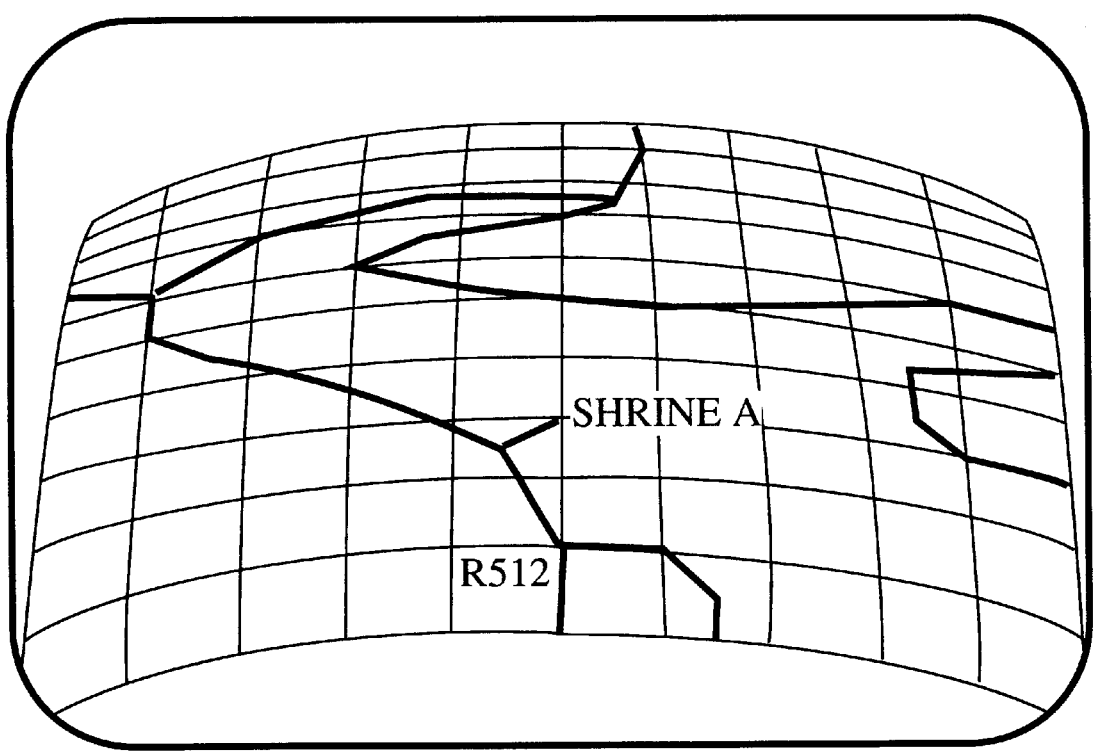
FIG. 11 shows an example of a map displayed by a displaying unit shown in FIG. 1.
Figure 12:
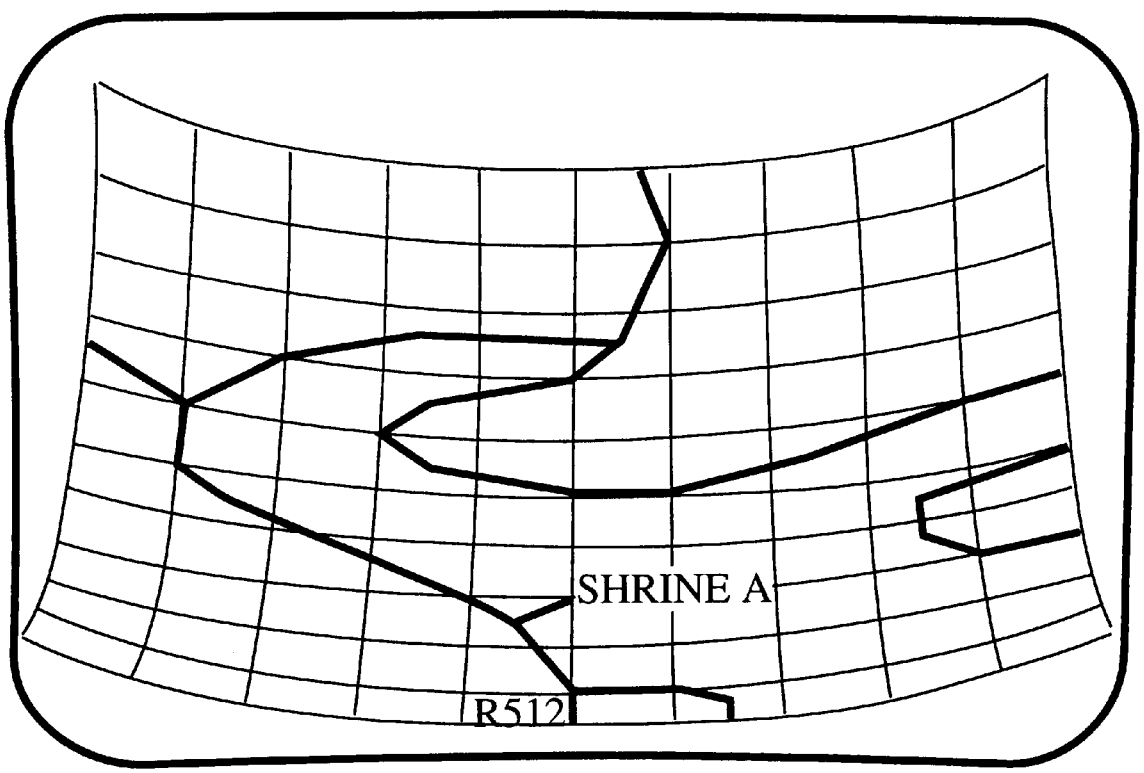
FIG. 12 shows an example of a map displayed by the displaying unit.

FIG. 11 shows an example display by the displaying unit 180 for the perspective projection result of FIG. 9, whereas FIG. 12 shows an example display by the displaying unit 180 for the perspective projection result of FIG. 10.

(Map Display Operation)

Figure 13:
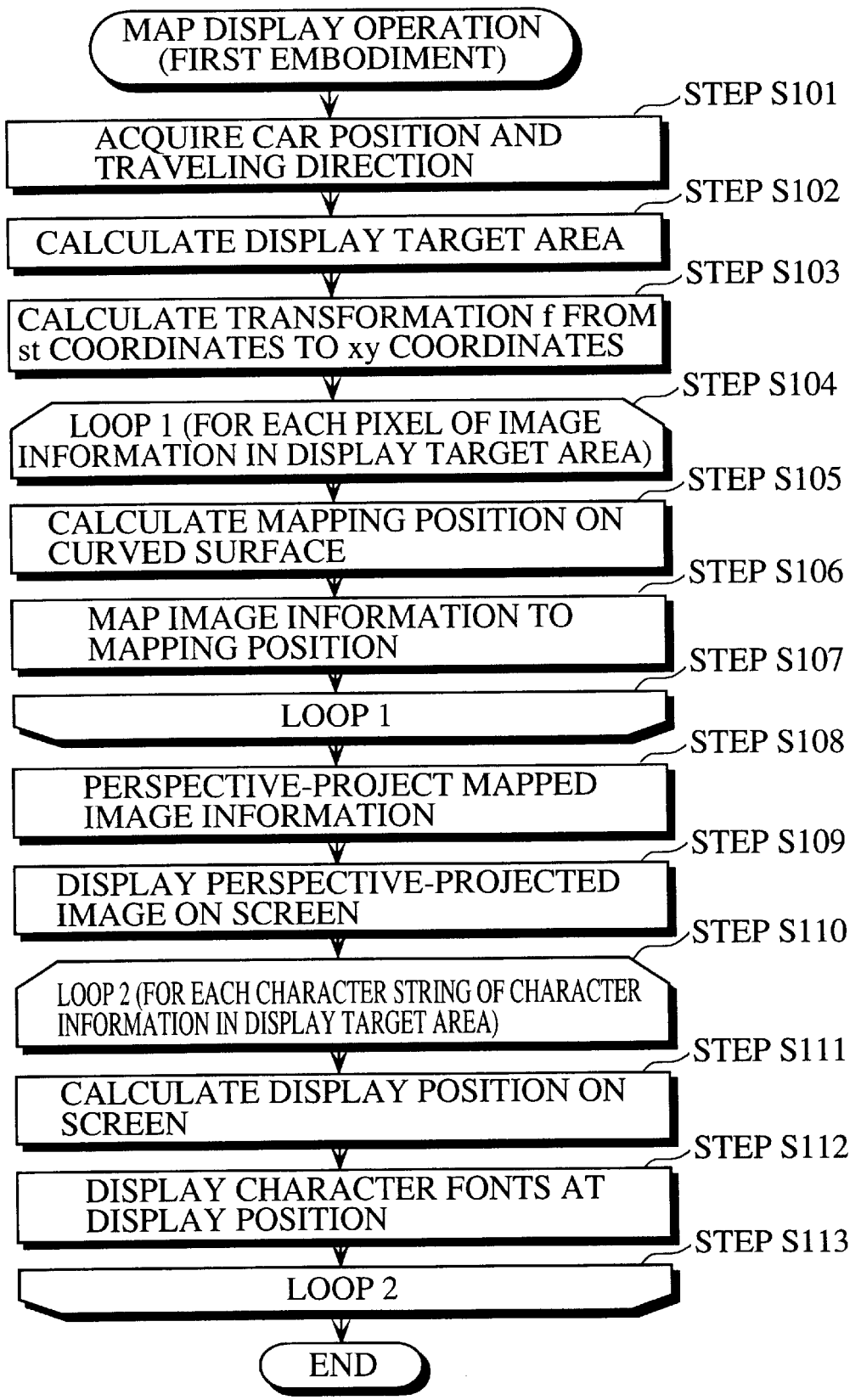
FIG. 13 is a flowchart showing a map display operation in the first embodiment.

A map display operation of the map display device 10 is explained below, with reference to FIG. 13.

The positional information receiving unit 155 outputs the car positional information showing the car position and the traveling direction, to the mapping unit 160 (S101) The mapping unit 160 calculates the display target area based on the car position and the traveling direction (S102), and calculates the transformation f from st coordinates to xy coordinates (S103).

For each pixel of the image information included in the display target area (S104), the mapping unit 160 calculates the mapping position on the curved surface defined by the surface information stored in the surface storing unit 140 using the transformation f (S105), and maps the pixel to the mapping position (S106). The projecting unit 170 perspective-projects the image information mapped by the mapping unit 160, onto the virtual screen (S108).

The displaying unit 180 enlarges or contracts the image perspective-projected on the virtual screen, and displays it on the whole display screen equipped therein (S109). Also, for each character string whose position is included in the display target area (S110), the displaying unit 180 calculates a display position on the screen (S111), and displays character fonts of the character string at the display position (S112).

(Conclusion)

As described above, the map display device 10 maps the image information on the curved surface, perspective-projects the mapped image information, and displays it. As a result, a map can be displayed with a desired portion enlarged or contracted, while maintaining connections of roads.

Here, the curved surface is designed so that the angle formed between the part of the curved surface to which the map portion to be enlarged is mapped and the line of sight in perspective projection is larger than the angles formed between the other parts of the curved surface and the lines of sight, and the angle formed between the part of the curved surface to which the map portion to be contracted is mapped and the line of sight in perspective projection is smaller than the angles formed between the other parts of the curved surface and the lines of sight. By perspective-projecting the image information mapped on such a curved surface, desired map portions can be enlarged or contracted.

Also, the map display device 10 does not subject the character information to mapping and perspective projection, but directly displays character fonts at a corresponding positions on the display screen. As a result, the deformation of the character fonts caused by mapping and perspective projection can be avoided.

Second Embodiment

The following is a description of a map display device 20 to which the second embodiment of the invention relates. The map display device 20 is a device that provides undulations corresponding to altitudes to a curved surface of an intended form, maps map information onto the curved surface provided with the undulations, perspective projects the mapped map information, and displays an image obtained as a result of the perspective projection. By doing so, a map which has a desired portion enlarged or contracted while maintaining connections of roads, and which has a three-dimensional appearance, is displayed. The features that are the same as those in the first embodiment are omitted, so that the following explanation focuses on the difference with the first embodiment.

(Overall Construction)

Figure 14:
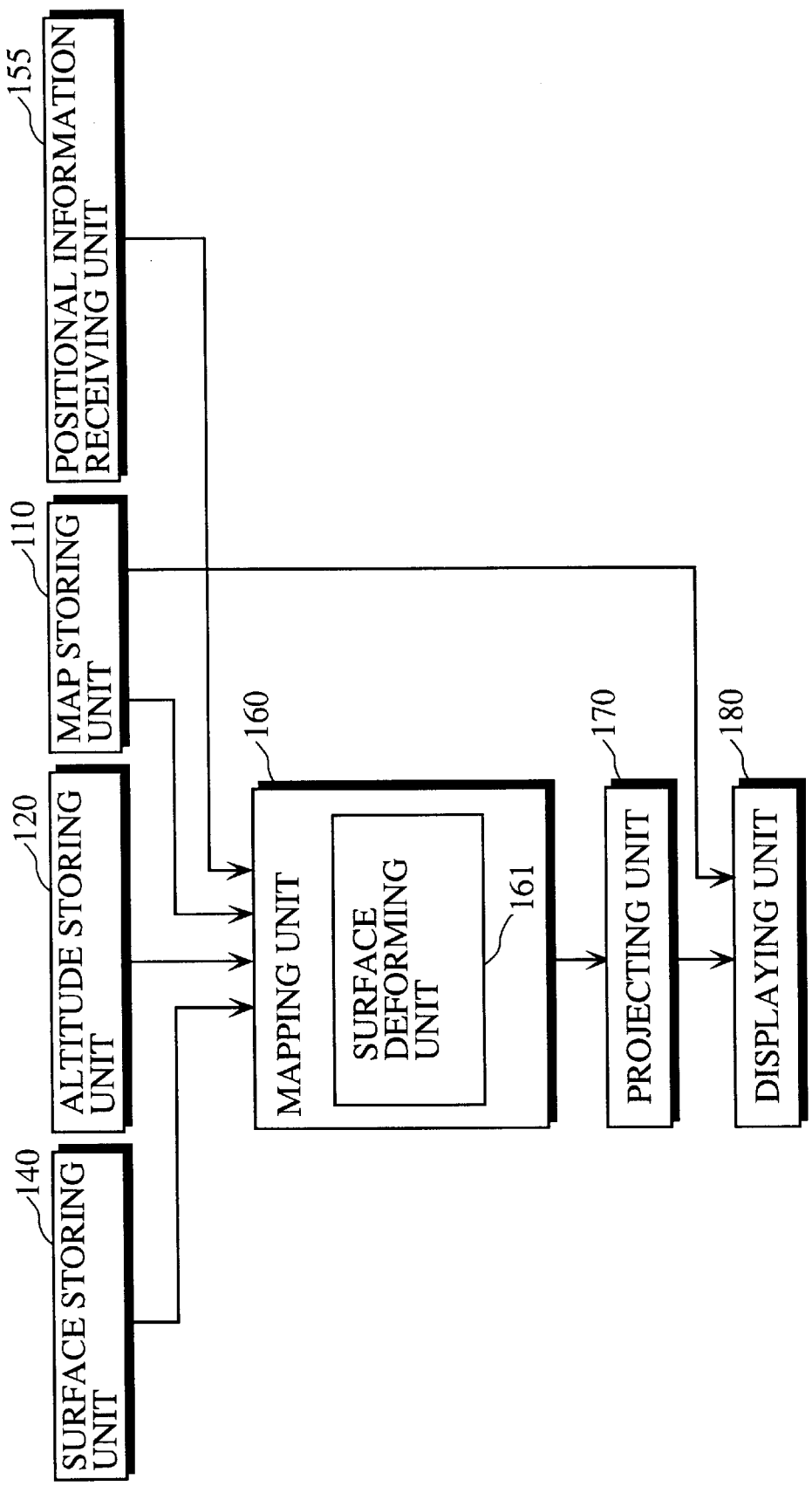
FIG. 14 is a block diagram showing a map display device according to the second embodiment of the invention.

As shown in FIG. 14, the map display device 20 includes the construction elements of the map display device 10 of the first embodiment, and further includes an altitude storing unit 120. Also, the mapping unit 160 includes a surface deforming unit 161.

(Altitude Storing Unit 120)

The altitude storing unit 120 stores altitude information which is made up of combinations of positions of altitude points and altitudes of the altitude points.

FIG. 15 shows an example of the altitude information stored in the altitude storing unit 120. An altitude table 121 lists a position and an altitude for each altitude point. Here, the position is expressed in the st coordinate system.

(Mapping Unit 160)

The mapping unit 160 receives the car positional information from the positional information receiving unit 155, calculates the display target area based on the received car positional information, and maps the image information included in the display target area onto a curved surface deformed by the surface deforming unit 161. The details are explained below.

The mapping unit 160 calculates the display target area and the transformation f, in the same way as in the first embodiment.

The mapping unit 160 notifies the surface deforming unit 161 of the display target area and the transformation f, instructs the surface deforming unit 161 to deform the curved surface defined by the surface information stored in the surface storing unit 140, and acquires surface information of the deformed curved surface from the surface deforming unit 161.

The mapping unit 160 then calculates, for each pixel of the image information included in the display target area, a point (f(s0,t0),z0) on the deformed curved surface to which a pixel at a pixel position (s0,t0) is to be mapped. This calculation is done by bilinear interpolating the coordinates of sample points which are in the vicinity of f(s0,t0) in x and y coordinates, using the information acquired from the surface deforming unit 161. The mapping unit 160 then maps each pixel of the image information to the calculated point (f(s0,t0),z0), as in the first embodiment.

(Surface Deforming Unit 161)

The surface deforming unit 161 is notified by the mapping unit 160 of the display target area and the transformation f, deforms the curved surface defined by the surface information stored in the surface storing unit 140 in accordance with the altitude information, and outputs the result to the mapping unit 160. The details are explained below.

The surface deforming unit 161 calculates, for each altitude point included in the display target area, a point (f(s0,t0),z0) on the curved surface corresponding to an altitude point at a position (s0,t0). The surface deforming unit 161 then calculates a point (f(s0,t0),z0+ah) by adding the result of multiplying an altitude h by a constant a, to z0. The surface deforming unit 161 notifies the mapping unit 160 of the calculated point, as a sample point which defines the deformed curved surface. Here, the constant a is a scale for altitudes in the xyz coordinate system, and also represents the degree of emphasis on undulations. In other words, the greater the value of a, the more emphasis is placed on undulations.

Figure 16:
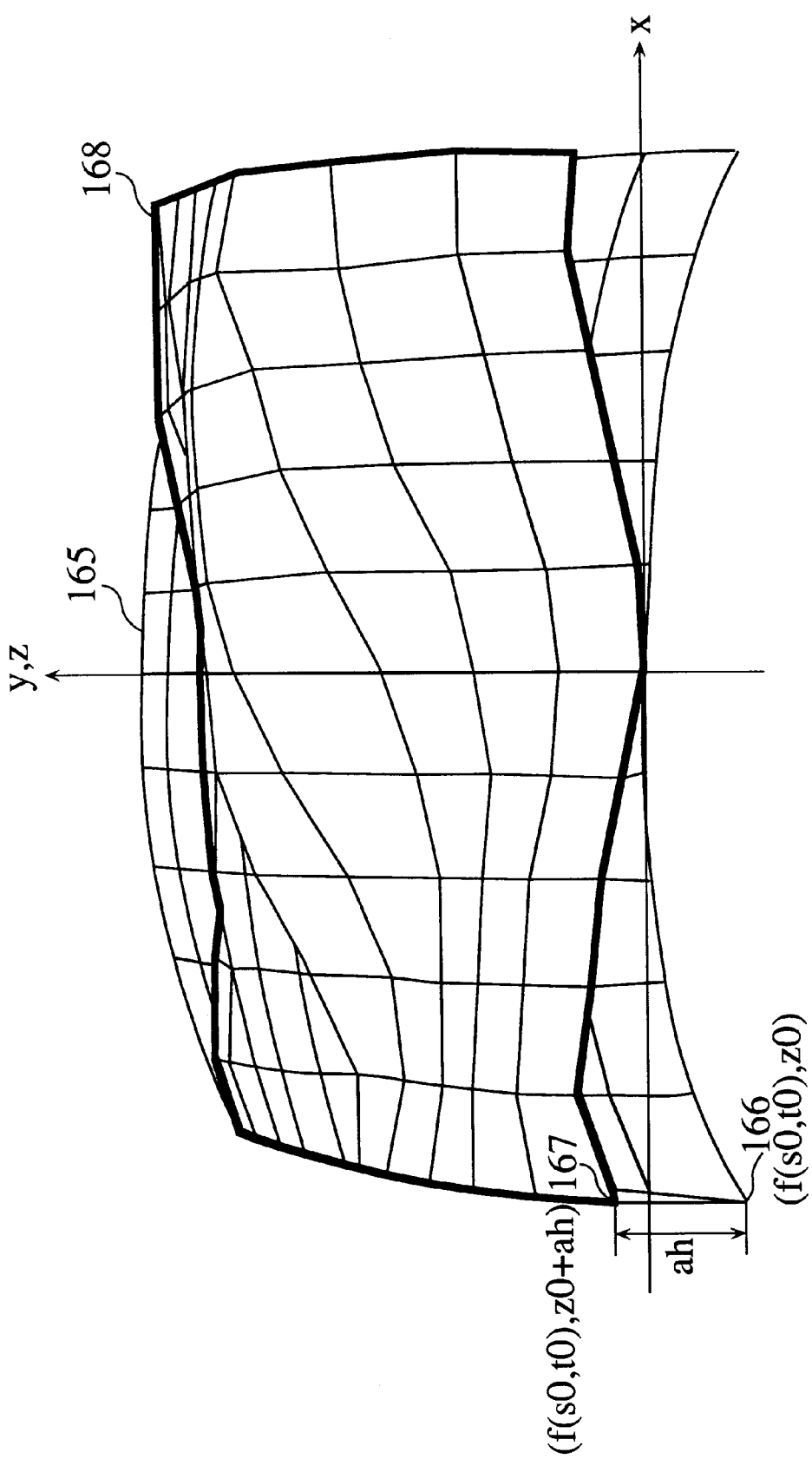
FIG. 16 is a conceptual view for explaining deformation performed by a surface deforming unit shown in FIG. 14.

FIG. 16 is a conceptual view showing the deformation performed by the surface deforming unit 161. In the drawing, reference numeral 165 is the curved surface defined by the surface information stored in the surface storing unit 140, 166 an example point on the curved surface corresponding to a position of an altitude point, 167 a point when the point 166 is moved in the z direction in accordance with the altitude h, and 168 the deformed curved surface.

Here, the difference with the mean or minimum value of the altitude values included in the display target area may be set as h. Also, when a sample point for defining the deformed curved surface needs to be provided at a predetermined xy coordinate position but there is no altitude point at that position, the sample point may be calculated by interpolating altitudes of neighboring altitude points using bilinear interpolation or the like.

Figure 17:
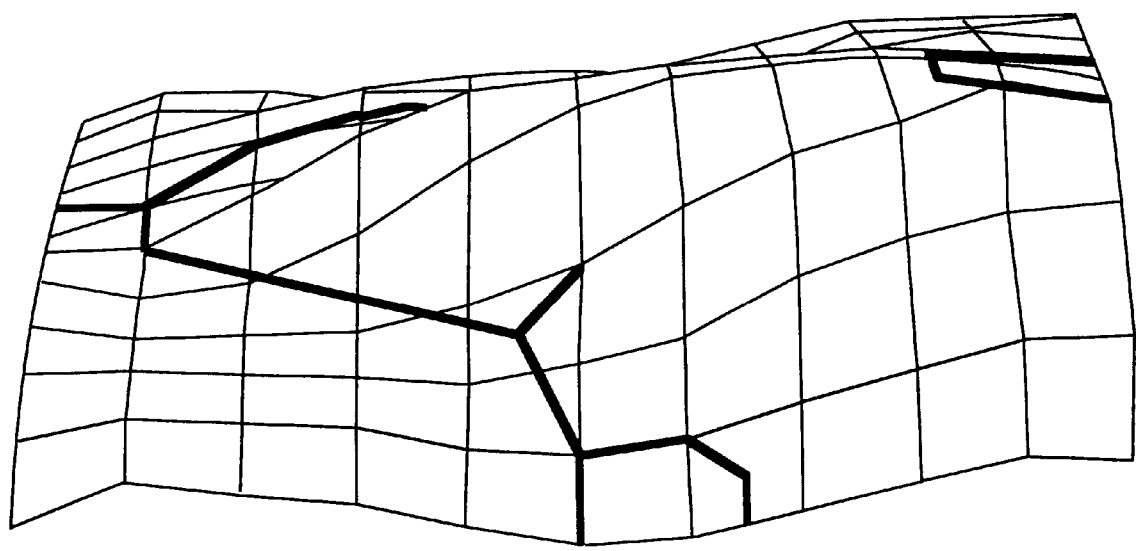
FIG. 17 shows an example of image information mapped by a mapping unit shown in FIG. 14.
Figure 18:
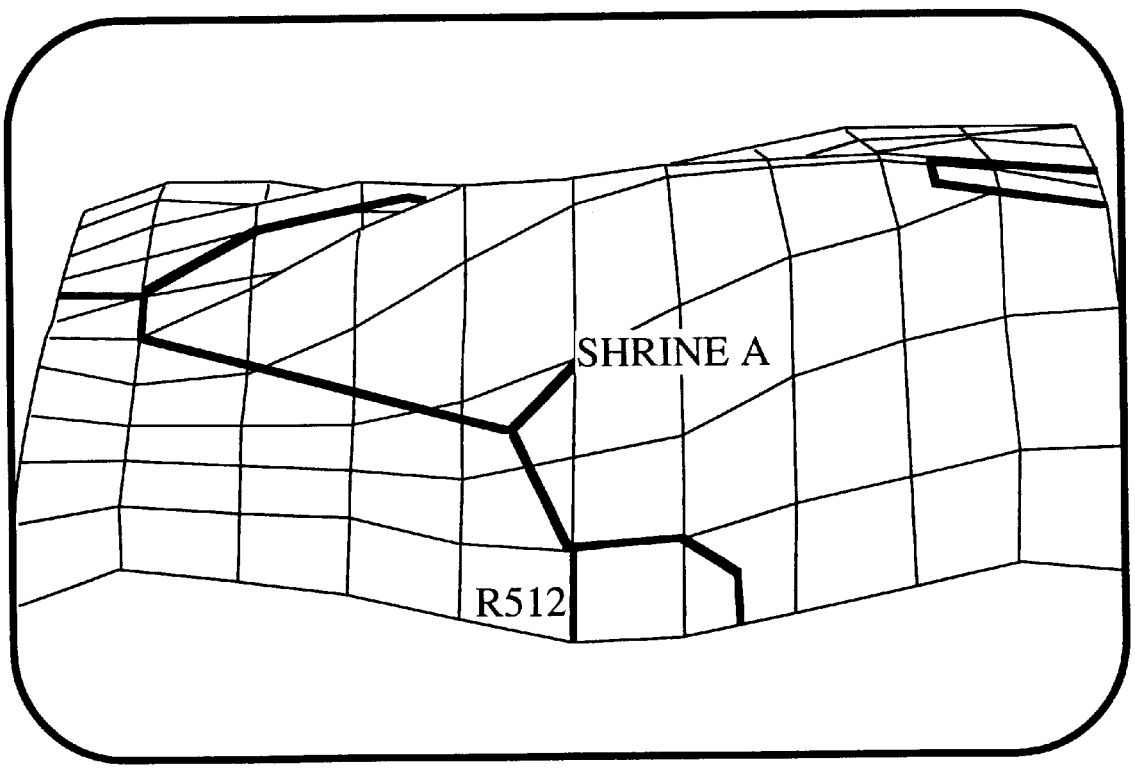
FIG. 18 shows an example of a map displayed by a displaying unit shown in FIG. 14.

FIG. 17 shows an example of the mapping result by the mapping unit 160 on the curved surface deformed by the surface deforming unit 161. FIG. 18 shows an example display by the displaying unit 180 for the image obtained by perspective-projecting the mapping result of FIG. 17 by the projecting unit 170.

(Map Display Operation)

Figure 19:
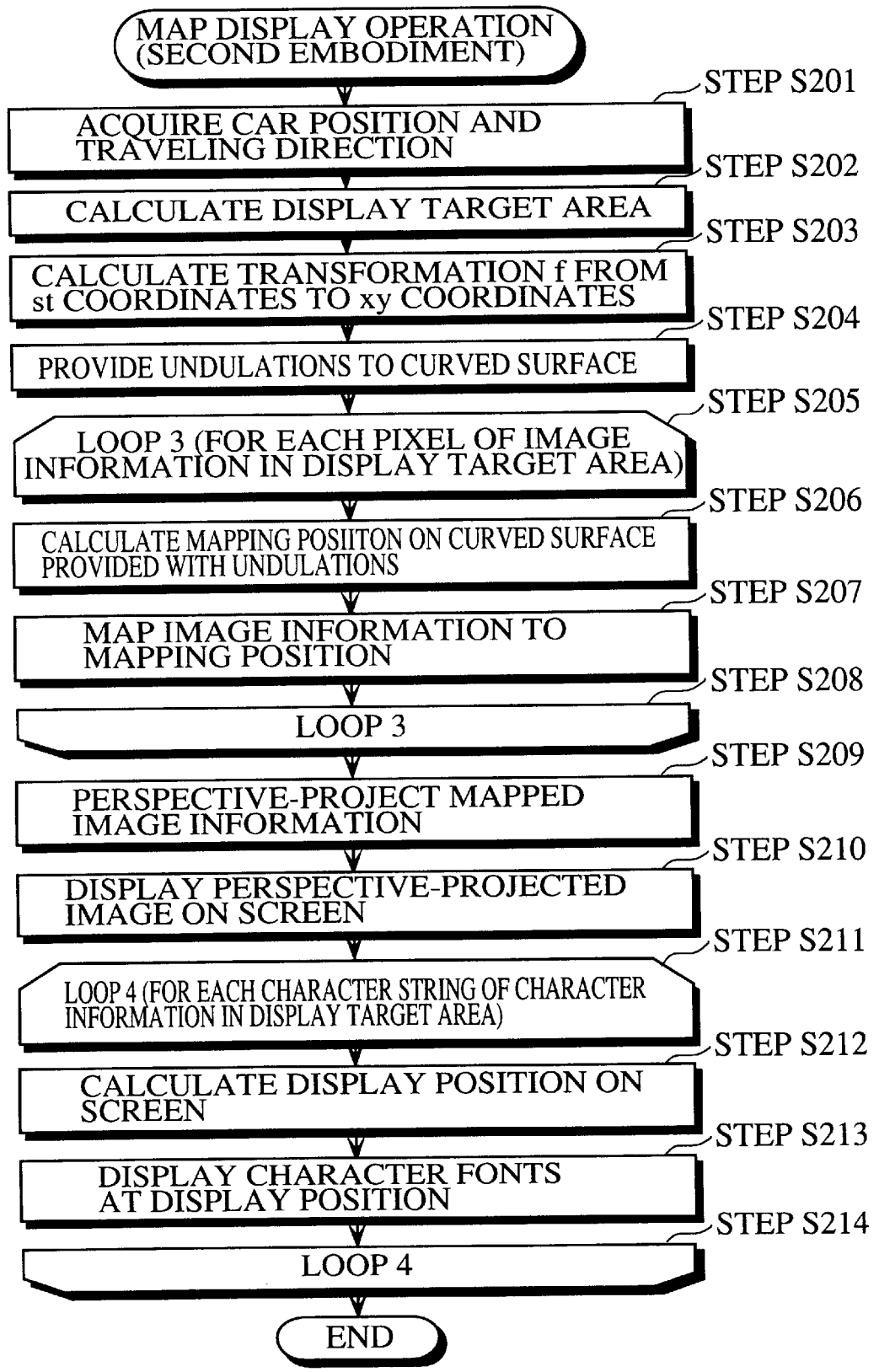
FIG. 19 is a flowchart showing a map display operation in the second embodiment.

A map display operation of the map display device 20 is explained below, with reference to FIG. 19.

The positional information receiving unit 155 outputs the car positional information showing the car position and the traveling direction, to the mapping unit 160 (S201) The mapping unit 160 calculates the display target area based on the car position and the traveling direction (S202), and calculates the transformation f (S203).

The surface deforming unit 161 deforms the curved surface defined by the surface information stored in the surface storing unit 140, in accordance with the altitude information which relates to the display target area (S204).

For each pixel of the image information included in the display target area (S205), the mapping unit 160 calculates a mapping position on the curved surface deformed by the surface deforming unit 161 (S206), and maps the pixel to the mapping position (S207). The projecting unit 170 perspective-projects the image information mapped by the mapping unit 160, onto the virtual screen (S209).

The displaying unit 180 enlarges or contracts the image perspective-projected on the virtual screen, and displays it on the whole display screen equipped therein (S210). Also, for each character string whose position is included in the display target area (S211), the displaying unit 180 calculates a display position on the display screen (S212), and displays character fonts of the character string at the display position (S213).

(Conclusion)

As described above, the map display device 20 provides the undulations corresponding to the altitudes to the curved surface having the same form as that in the first embodiment, maps the image information onto the curved surface provided with the undulations, and perspective-projects and displays the mapped image information. As a result, a map can be displayed with a desired portion enlarged or contracted and with a three-dimensional appearance.

Also, the map display device 20 avoids the deformation of the character fonts caused by mapping and perspective projection, as in the first embodiment.

Third Embodiment

The following is a description of a map display device 30 to which the third embodiment of the invention relates. The map display device 30 is a device that provides undulations corresponding to altitudes to a curved surface of an intended form except a car position and its vicinity, maps map information onto the curved surface provided with the undulations, perspective-projects the mapped map information, and displays an image obtained as a result of the projection. In so doing, a map which has a desired portion enlarged or contracted with connections of roads maintained, and which has a three-dimensional appearance, is displayed. The map display device 30 also prevents the map display around the car position from being hidden by the undulations. The features which are the same as the second embodiment are omitted, so that the following explanation focuses on the difference.

(Overall Construction)

Figure 20:
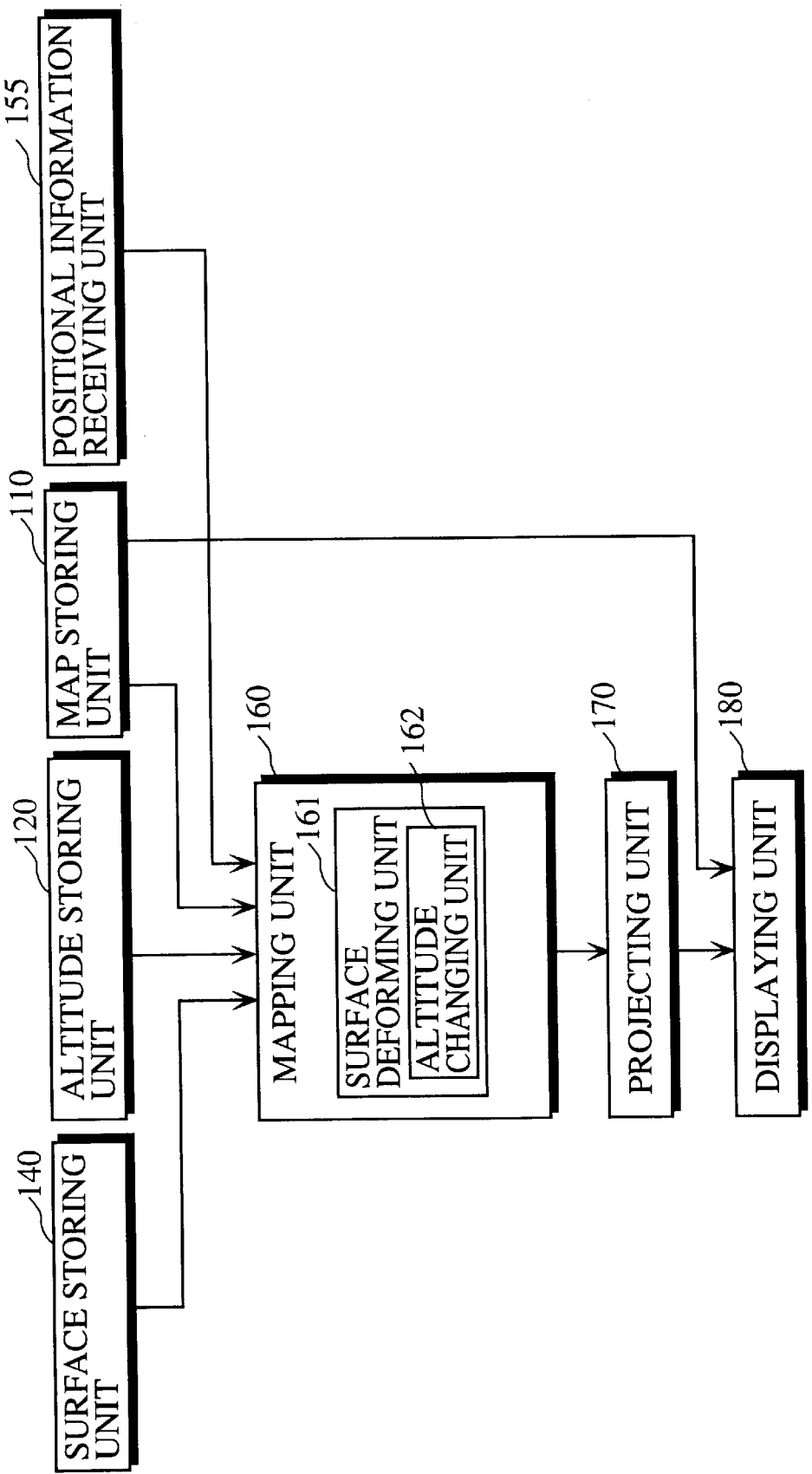
FIG. 20 is a block diagram showing a map display device according to the third embodiment of the invention.

As shown in FIG. 20, in the map display device 30 the surface deforming unit 161 includes an altitude changing unit 162.

(Surface Deforming Unit 161)

The surface deforming unit 161 deforms the curved surface defined by the surface information stored in the surface storing unit 140, in accordance with altitude information which is changed by the altitude changing unit 162, and outputs the result to the mapping unit 160.

(Altitude Changing Unit 162)

The altitude changing unit 162 sets a flat area which contains the car position and its vicinity, changes altitudes of altitudes points in the flat area to a uniform value, and changes altitudes of altitudes points around the flat area according to their distances from the flat area. The details are explained below.

The altitude changing unit 162 calculates a rectangular area which is a part of the display target area and which contains the car position, as the flat area. As an example, the altitude changing unit 162 calculates an area having a range of 5 km ahead of the car position and 1 km to both the left and the right.

The altitude changing unit 162 changes altitudes of all altitude points in the flat area, to the lowest altitude value hlow in the flat area.

The altitude changing unit 162 then uses a function $$q(d)=d(0<d\leq 1), 1(1<d)$$

of a distance d from the flat area, to change an altitude h of an altitude point which is at a distance d0 from the flat area, to $$hlow+q(d0)\times(h-hlow)$$

Figure 21:
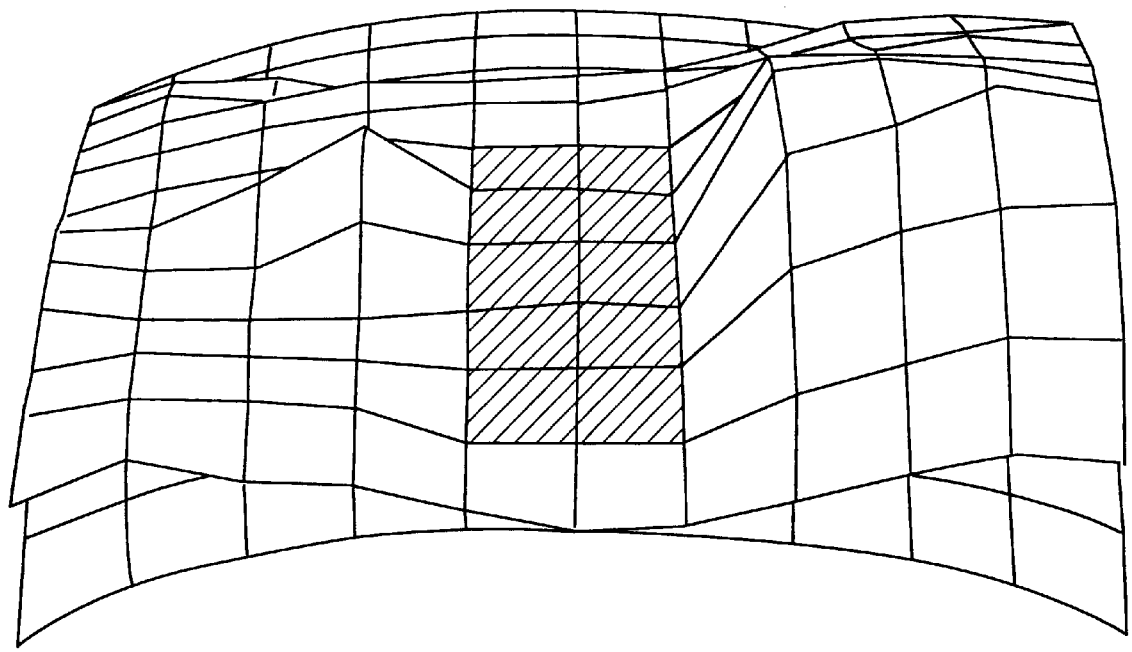
FIG. 21 shows an example of a curved surface deformed by a surface deforming unit shown in FIG. 20.

FIG. 21 shows an example of the curved surface deformed by the surface deforming unit 161 using the changed altitude information. In the drawing, a diagonally shaded region is the flat area. Since altitudes of altitude points in the flat area are changed to the uniform value, no undulations are provided in that area. This suppression of undulations is gradually removed around the flat area, depending on distances from the flat area.

Figure 22:
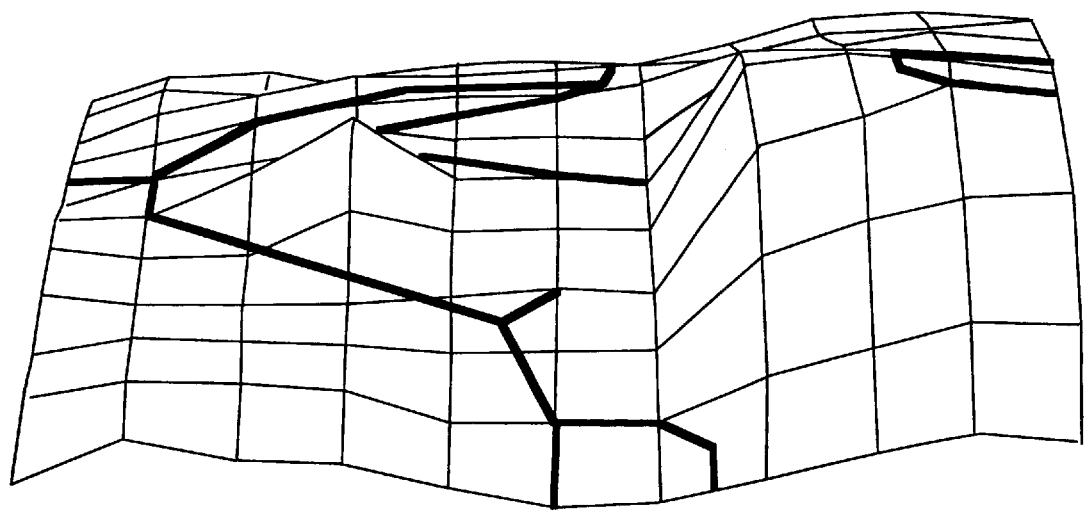
FIG. 22 shows an example of image information mapped by a mapping unit shown in FIG. 20.
Figure 23:
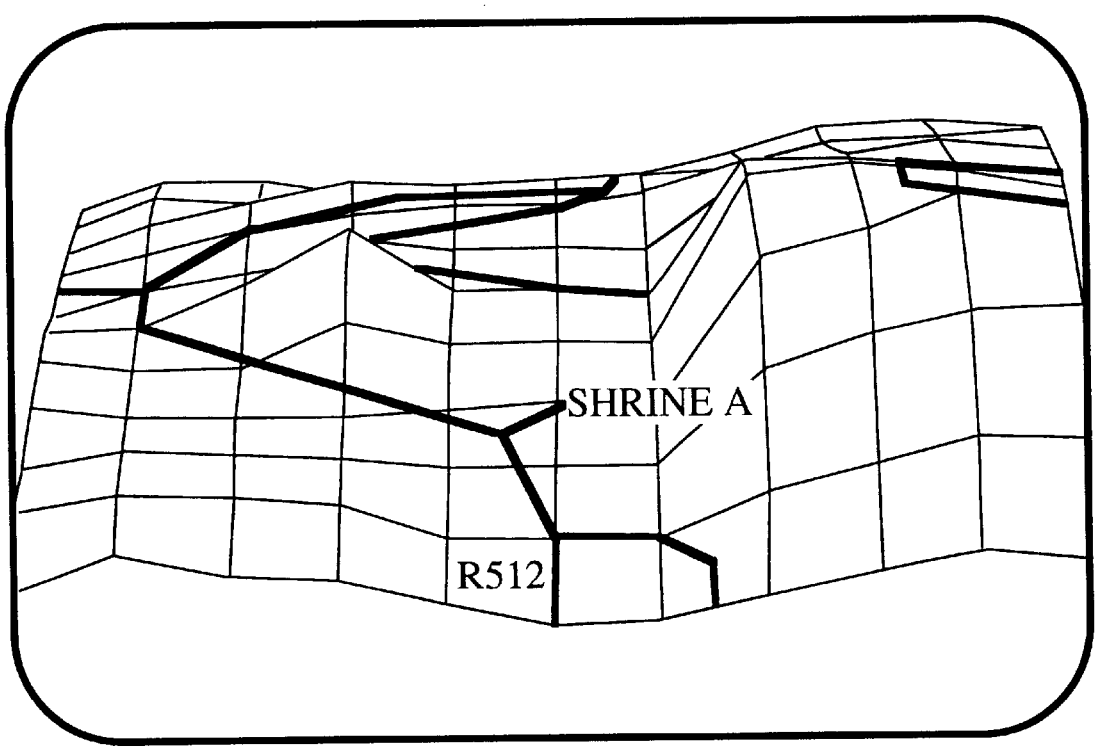
FIG. 23 shows an example of a map displayed by a displaying unit shown in FIG. 20.

FIG. 22 shows an example of the mapping result by the mapping unit 160 on the curved surface deformed by the surface deforming unit 161. FIG. 23 shows an example display by the displaying unit 180 for the image obtained by perspective-projecting the mapping result of FIG. 22 by the projecting unit 170.

Thus, the map display device 30 suppresses the provision of undulations in the flat area, so that roads existing ahead of the flat area can be displayed without being obstructed by a mountain and the like. The effect achieved by this construction is remarkable, when compared with the example display shown in FIG. 18 in the second embodiment.

(Map Display Operation)

Figure 24:
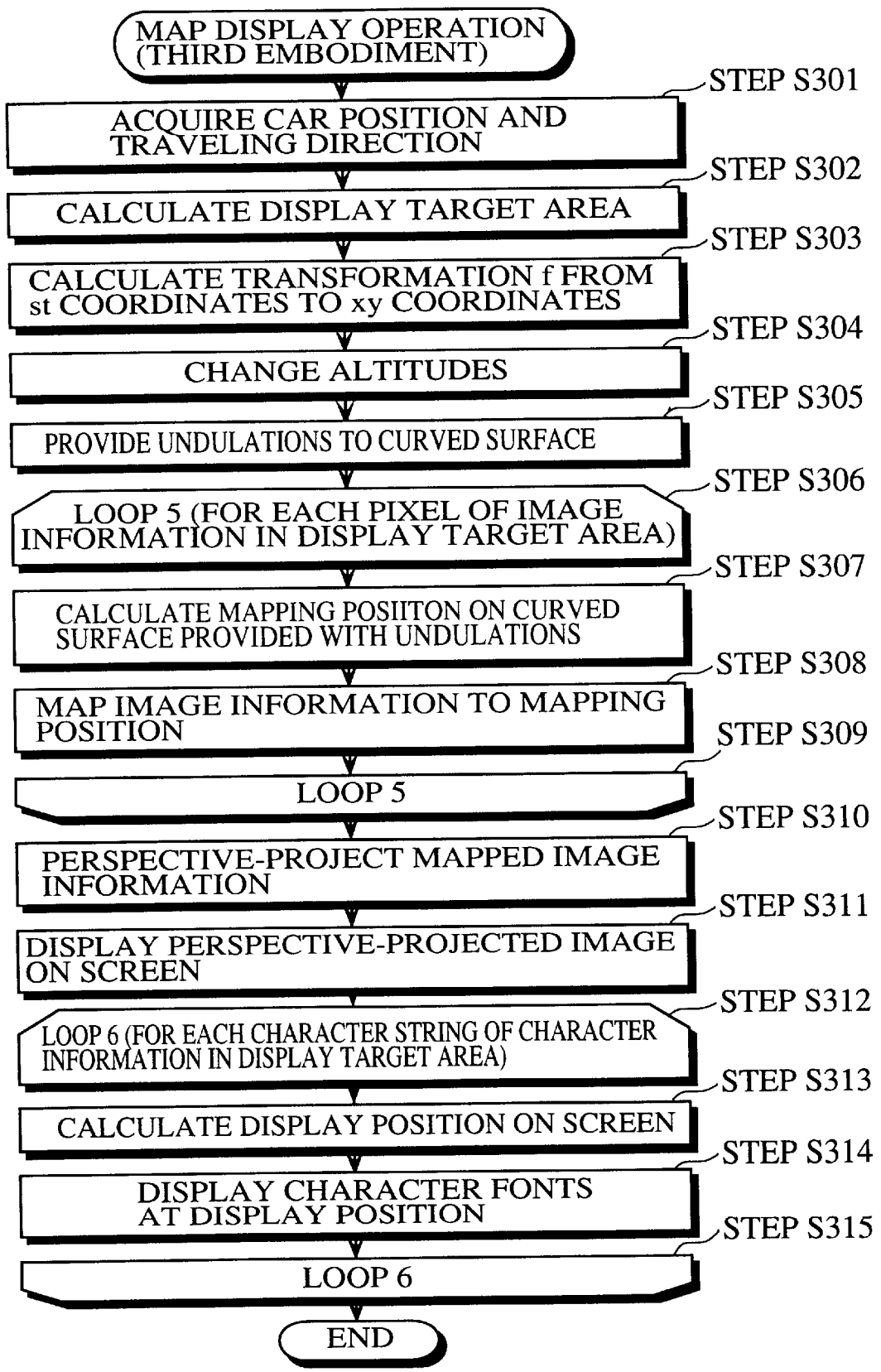
FIG. 24 is a flowchart showing a map display operation in the third embodiment.

A map display operation of the map display device 30 is explained below, with reference to FIG. 24.

The positional information receiving unit 155 outputs the car positional information showing the car position and the traveling direction, to the mapping unit 160 (S301) The mapping unit 160 calculates the display target area based on the car position and the traveling direction (S302), and calculates the transformation f (S303).

The altitude changing unit 162 changes the altitudes in the flat area to the uniform value, and changes the altitudes in the vicinity of the flat area in accordance with the distances from the flat area (S304).

The surface deforming unit 161 deforms the curved surface defined by the surface information stored in the surface storing unit 140, according to the altitude information changed by the altitude changing unit 162 (S305).

For each pixel of the image information included in the display target area (S306), the mapping unit 160 calculates a mapping position on the curved surface deformed by the surface deforming unit 161 (S307), and maps the pixel to the mapping position (S308). The projecting unit 170 perspective-projects the image information mapped by the mapping unit 160, onto the virtual screen (S310).

The displaying unit 180 enlarges or contracts the image perspective-projected on the visual screen, and displays it on the whole display screen equipped therein (S311). Also, for each character string whose position is included in the display target area (S312), the displaying unit 180 calculates a display position on the display screen (S313), and displays character fonts of the character string at the display position (S314).

(Conclusion)

As described above, the map display device 30 provides the undulations corresponding to the altitudes to the curved surface having the same form as that of the second embodiment, except the car position and its vicinity. The map display device 30 then maps the image information onto the curved surface provided with the undulations, and perspective-projects and displays the mapped image information. As a result, a map can be displayed with a desired portion enlarged or contracted and with a three-dimensional appearance. Also, the map display device 30 suppresses the display of undulations around the car position, to prevent the map from being obstructed by the undulations.

Further, the map display device 30 avoids the deformation of the character fonts caused by mapping and perspective projection, as in the first embodiment.

Fourth Embodiment

The following is a description of a map display device 40 to which the fourth embodiment of the invention relates. The map display device 40 is a device that perspective-projects map information onto a virtual screen having an intended curved surface form, projects an image obtained by perspective projection onto a display screen, and displays it.

In so doing, a map is displayed with a desired portion enlarged or contracted, while maintaining connections of roads. The same features as those in the first embodiment are omitted, and the following explanation focuses on the difference.

(Overall Construction)

As shown in FIG. 25, the map display device 40 includes a map storing unit 210, a surface storing unit 240, a positional information receiving unit 255, a projecting unit 270, and a displaying unit 280.

(Map Storing Unit 210)

The map storing unit 210 is the same as the map storing unit 110 in the first embodiment, and stores map information made up of image information and character information.

(Positional Information Receiving Unit 255)

The positional information receiving unit 255 receives car positional information relating to a current position and traveling direction of a car in which the map display device 40 is equipped, from an outside device such as a GPS or inertial navigation device. The positional information receiving unit 255 then outputs the car positional information to the projecting unit 270. The structure of the car positional information is the same as that in the first embodiment.

(Surface Storing Unit 240)

The surface storing unit 240 stores surface information that defines a curved surface which exists within a virtual space and which serves as a virtual screen for perspective projection. Here, the virtual space is expressed using the three-dimensional orthogonal coordinate system called "xyz coordinate system", as in the first embodiment.

The curved surface is designed such that an angle between a part of the curved surface to which a map portion to be enlarged is perspective-projected and a line of sight in perspective projection is smaller than any angles between the other parts of the curved surface and lines of sight, and an angle between a part of the curved surface to which a map portion to be contracted is perspective-projected and a line of sight in perspective projection is larger than any angles between the other parts of the curved surface and lines of sight. The effect achieved by such a form is detailed in the description of the projecting unit 270.

The surface storing unit 240 stores the surface information defining the curved surface in one of the following forms, as in the first embodiment.

(1) A curved surface expressed by a relationship equation of x, y, and z.

(2) A curved surface obtained by interpolating a plurality of sample points on the curved surface.

(3) A curved surface obtained by expressing the x, y, and z coordinates of a point on the curved surface using parameters u and v.

Figure 26A:
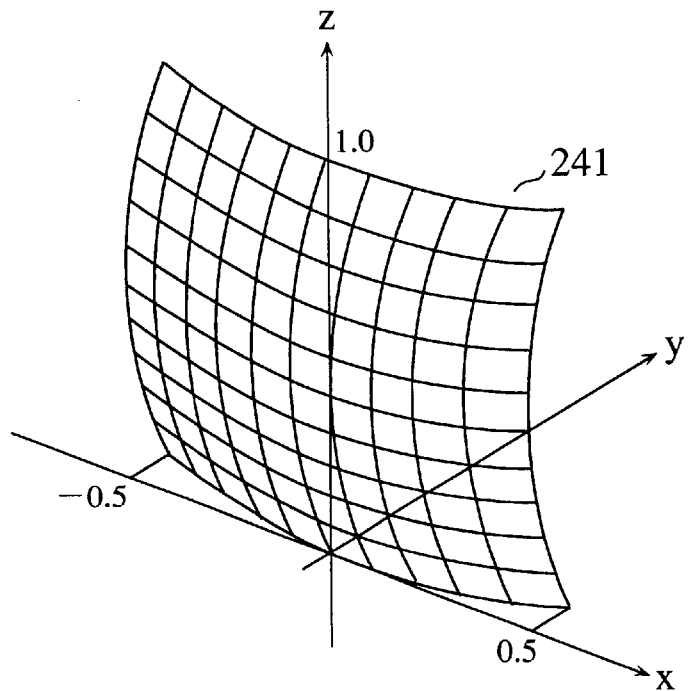
FIG. 26 shows examples of curved surfaces stored in a surface storing unit shown in FIG. 25.
Figure 26B:
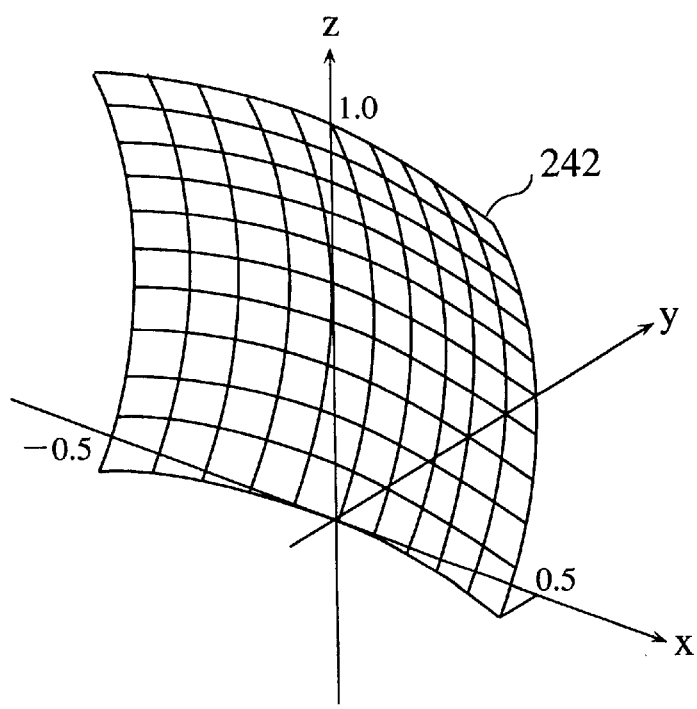

FIGS. 26A and 26B each show an example curved surface defined by the surface information stored in the surface storing unit 240. FIG. 26A shows a curved surface 241 expressed by a relationship equation $$x^2+(y-1)^2+(z-0.5)^2=1.25$$

whereas FIG. 26B shows a curved surface 242 expressed by a relationship equation $$x^2+(y+1)^2+(z-0.5)^2=1.25$$

each for the range of $-0.5 \leq x \leq 0.5$ and $0 \leq z \leq 1$. To facilitate the understanding of the form of each curved surface, geodesic lines are provided in 0.1 intervals for both of the x and y coordinates. Note that a curved surface in a virtual space can be similarly defined through the use of the above form (2) or (3) (not illustrated).

(Projecting Unit 270)

The projecting unit 270 calculates a display target area based on the car positional information received from the positional information receiving unit 255, and perspective-projects the image information included in the display target area, onto the virtual screen of the curved surface form defined by the surface information stored in the surface storing unit 240. This perspective projection is equivalent to an operation of mapping a map onto a curved surface. The details are explained below.

The projecting unit 270 calculates a rectangular area including the car position as the display target area, as in the first embodiment. FIG. 6 shows an example of the calculated area.

The projecting unit 270 then obtains a coordinate transformation which associates the st coordinates of the display target area to the xy coordinates of the virtual space. This transformation is composed of parallel translation and rotation in accordance with the car position and the traveling direction, and contraction. The projecting unit 270 calculates the transformation f, based on the parallel translation amount and the rotation amount in accordance with the car position and the traveling direction, and the contraction ratio.

Figure 27:
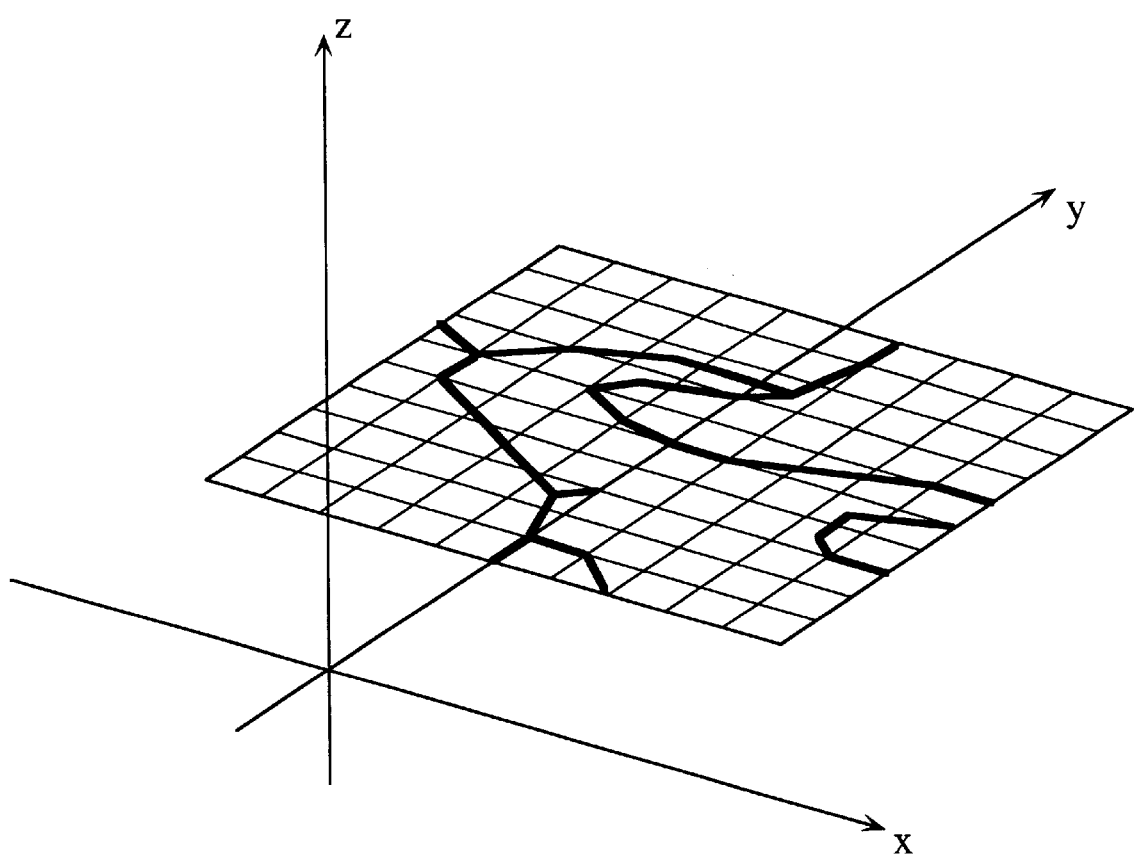
FIG. 27 shows an example of image information positioned within a virtual space for perspective projection.

FIG. 27 shows an example of the image information which is obtained by coordinate-transforming the image information included in the display target area of FIG. 6 using the transformation f, and positioned in the virtual space.

Figure 28A:
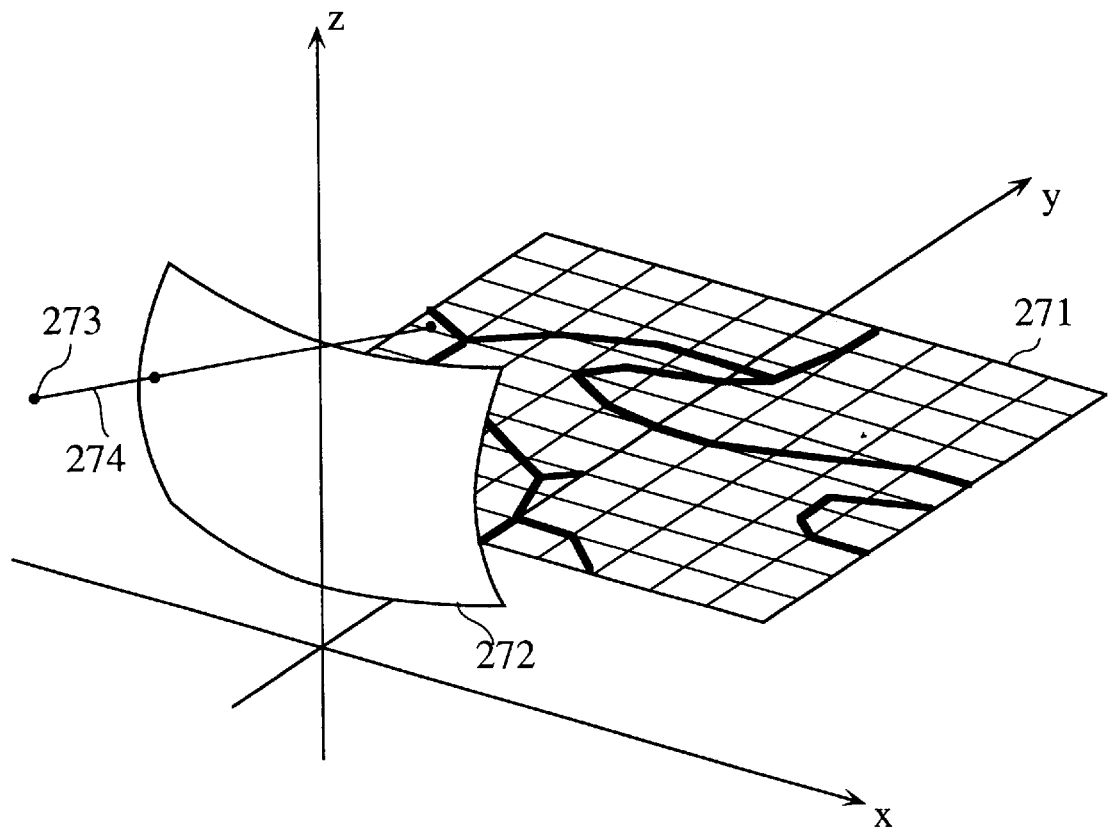
FIG. 28A is a conceptual view for explaining projection performed by a projecting unit shown in FIG. 25.

FIG. 28A is a conceptual view showing the perspective projection which is performed by the projecting unit 270 on the virtual screen shown in FIG. 26A, where the positional relations between a flat surface 271, a virtual screen 272, an eyepoint 273, and a line of sight 274 are shown. In the same manner as the conventional map display using the law of perspective, the projecting unit 270 virtually positions the eyepoint 273 before the flat surface 271 in the traveling direction at an appropriate height, and positions the virtual screen 272 so as to obtain appropriate vision. This being so, an image projected on the virtual screen 272 is analogous to a view when looking at an actual geographic area from the sky. This provides a realistic map to the driver and helps him or her comprehend the perspective.

Figure 28B:
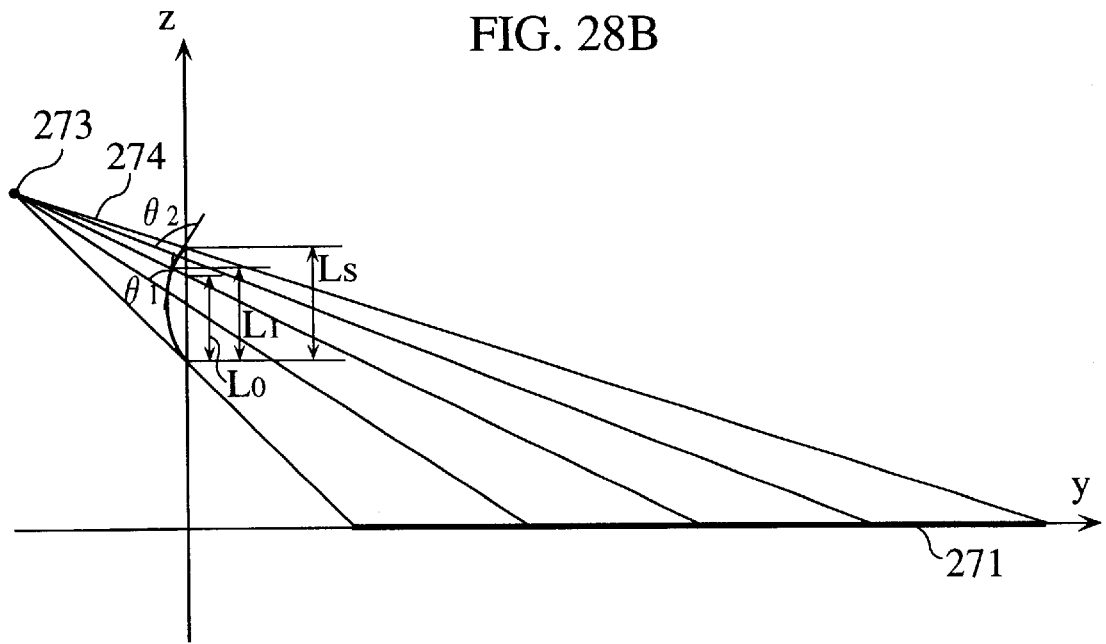
FIG. 28B is a sectional view of FIG. 28A where x=0.

FIG. 28B is a sectional view of FIG. 28A where x=0. In the drawing, Ls is the height of the virtual screen 272, and L1 is the length at which the nearer half of the flat surface 271 in the traveling direction is projected on the virtual screen 272. Also, to compare with the conventional map display, the length at which the nearer half of the flat surface 271 in the traveling direction is projected on a flat virtual screen having the same range as the virtual screen 272 in x and y coordinates is shown by L0.

As can be seen from the drawing, the virtual screen 272 intersects a line of sight directed to a nearer part of the flat surface 271 in the traveling direction at a small angle θ1, and intersects a line of sight directed to a farther part of the flat surface 271 in the traveling direction at a large angle θ2. Regarding a same-size part of the flat surface, the smaller an angle formed between the virtual screen and a line of sight, the larger an area perspective-projected on the virtual screen is. Therefore, in the image obtained by perspective-projecting the map on the flat surface 271, near-by areas are enlarged and distant areas are contracted. This is also clear from L0<L1.

Figure 29A:
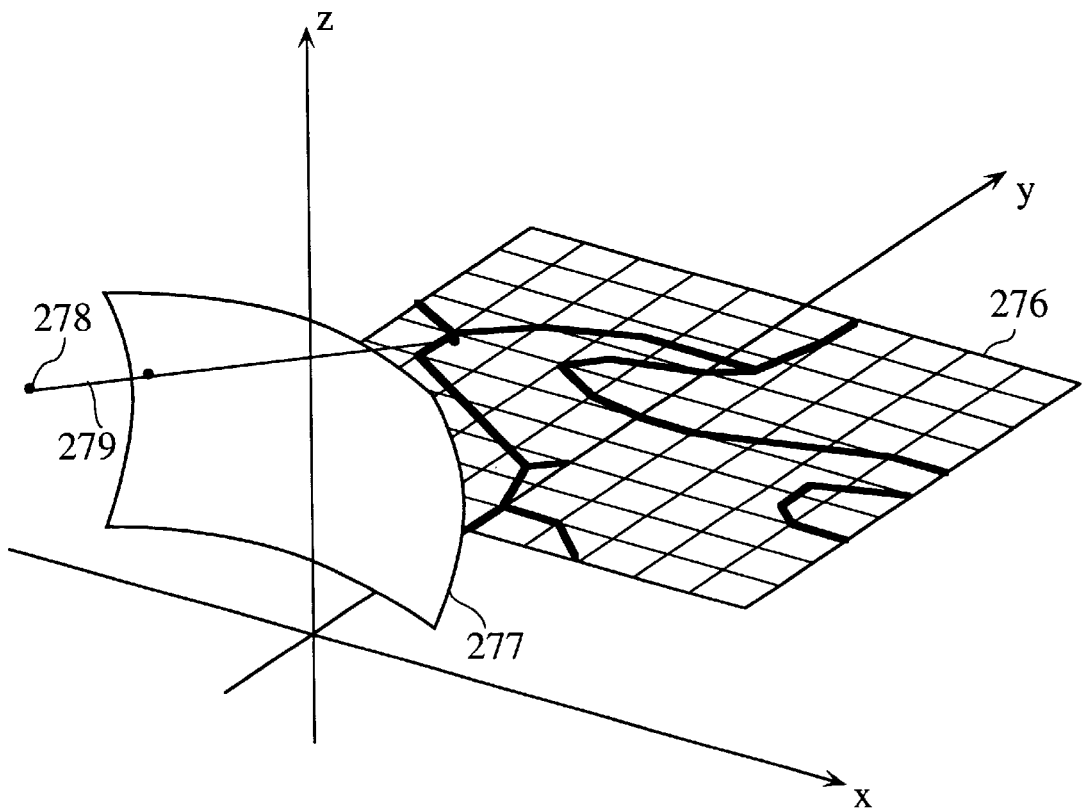
FIG. 29A is a conceptual view for explaining projection performed by the projecting unit.

FIG. 29A is a conceptual view showing the perspective projection on the virtual screen of FIG. 26B, where reference numeral 276 is a flat surface, 277 a virtual screen, 278 an eyepoint, and 279 a line of sight. Their positioning and the effects achieved by it are as described above.

Figure 29B:
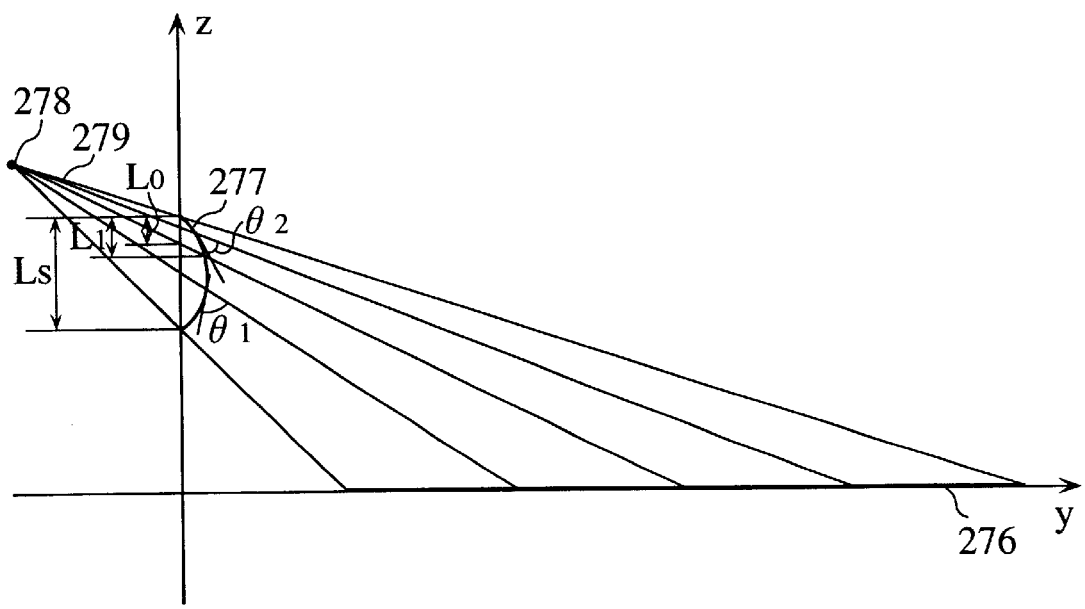
FIG. 29B is a sectional view of FIG. 29A where x=0.

FIG. 29B is a sectional view of FIG. 29A where x=0. In the drawing, Ls denotes the height of the virtual screen 277, L1 denotes the length at which the farther half of the flat surface 276 in the traveling direction is projected on the virtual screen 277, and L0 denotes the length at which the farther half of the flat surface 276 is projected on a flat virtual screen having the same range as the virtual screen 277 in x and z coordinates.

The virtual screen 277 intersects a line of sight which is directed to a nearer part of the flat surface 276 in the traveling direction at a large angle θ1, and intersects a line of sight which is directed to a farther part of the flat surface 276 in the traveling direction at a small angle θ2. Accordingly, in the image obtained by perspective-projecting the map on the flat surface 276, near-by areas are contracted while distant areas are enlarged. This is also clear from L0<L1.

Thus, the curved surface is designed such that the angle formed between the part of the curved surface to which the map portion to be enlarged is perspective-projected and the line of sight in perspective projection is smaller than the angles formed between the other parts of the curved surface and the lines of sight, and the angle formed between the part of the curved surface to which the map portion to be contracted is perspective-projected and the line of sight in perspective projection is larger than the angles formed between the other parts of the curved surface and the lines of sight. By perspective-projecting the image information onto the virtual screen having such a curved surface form, an image is produced with a desired portion enlarged or contracted, while maintaining connections of roads.

(Displaying Unit 280)

The displaying unit 280 is equipped with a display screen realized by a liquid crystal panel, a cathode-ray tube, a plasma panel, an EL panel, or similar, and displays the character information and the image which is perspective-projected by the projecting unit 270, on the display screen. The details are explained below.

The displaying unit 280 projects the image perspective-projected on the virtual screen, onto the display screen, and displays it.

The displaying unit 280 then calculates, for each character string whose position is included in the display target area, a point on the virtual screen to which a point (f(s0,t0),0) obtained by expressing a character position (s0,t0) in the xyz coordinate system is perspective-projected. The displaying unit 280 further calculates a point on the display screen to which the point on the virtual screen is projected, and displays character fonts of the character string, centering on the calculated point on the display screen.

Thus, the map display device 40 avoids the deformation of the character fonts caused by mapping and perspective projection, as in the first embodiment.

(Map Display Operation)

Figure 30:
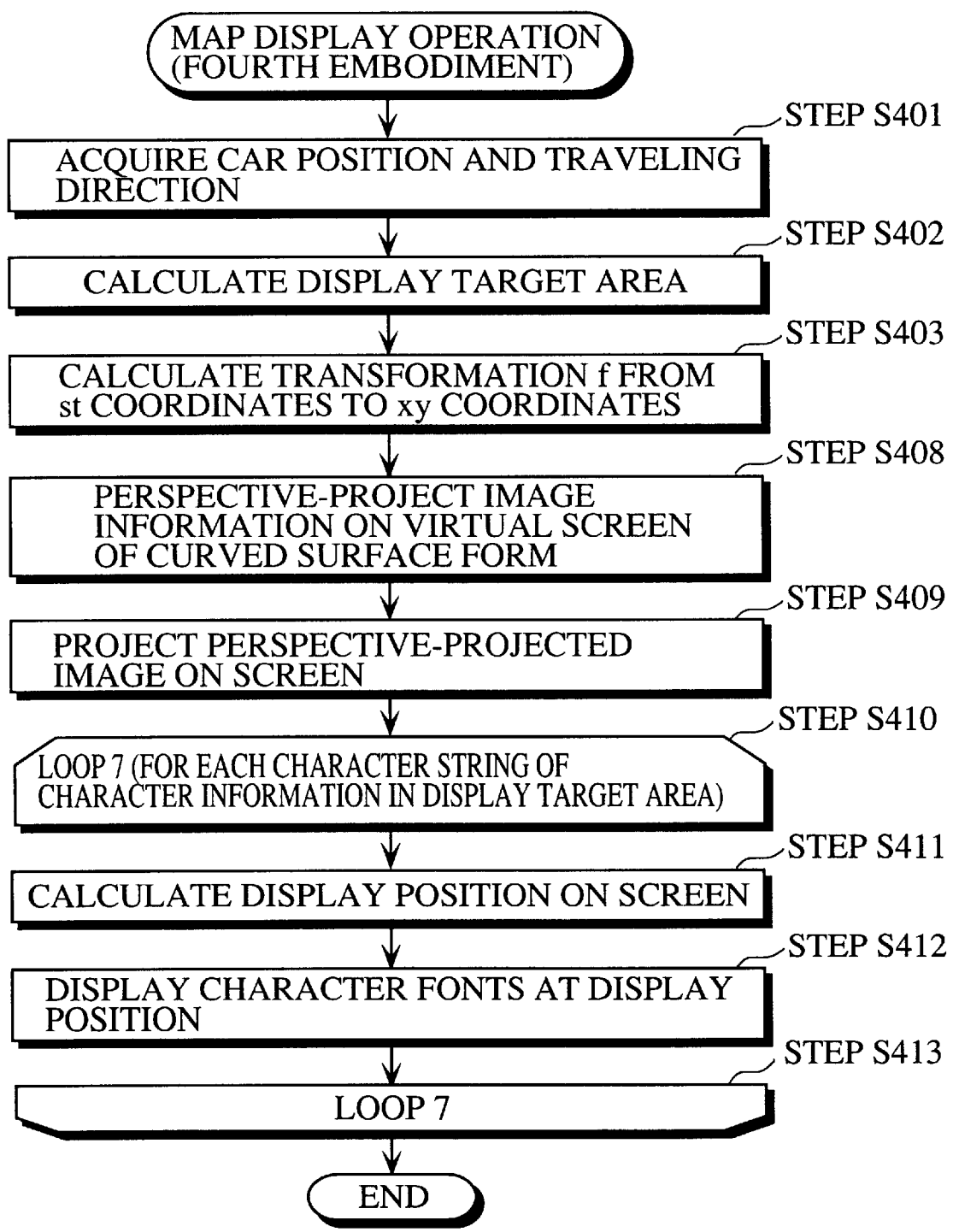
FIG. 30 is a flowchart showing a map display operation in the fourth embodiment.

A map display operation of the map display device 40 is explained below, with reference to FIG. 30.

The positional information receiving unit 255 outputs the car positional information showing the car position and the traveling direction, to the projecting unit 270 (S401). The projecting unit 270 calculates the display target area based on the car position and the traveling direction (S402), and calculates the transformation f from st coordinates to xy coordinates of the virtual space (S403).

The projecting unit 270 positions the image information included in the display target area, in the virtual space using the transformation f. The projecting unit 270 then perspective-projects the image information onto the virtual screen defined by the surface information stored in the surface storing unit 240 (S408).

The displaying unit 280 projects the image perspective-projected on the virtual screen, onto the display screen equipped therein, and displays it (S409) Also, for each character string whose position is included in the display target area (S410), the displaying unit 280 calculates a display position on the display screen (S411), and displays character fonts of the character string at the display position (S412).

(Conclusion)

As described above, the map display device 40 perspective-projects the image information onto the virtual screen having the curved surface form, projects the perspective-projected image onto the display screen, and displays it. As a result, a map is displayed with a desired portion enlarged or contracted, while maintaining connections of roads.

Here, the curved surface is designed so that the angle formed between the part of the curved surface to which the map portion to be enlarged is perspective-projected and the line of sight in perspective projection is smaller than the angles formed between the other parts of the curved surface and the lines of sight, and the angle formed between the part of the curved surface to which the map portion to be contracted is perspective-projected and the line of sight in perspective projection is larger than the angles formed between the other parts of the curved surface and the lines of sight. By perspective-projecting the image information on the virtual screen having such a curved surface form, a desired portion can be enlarged or contracted.

Also, the map display device 40 avoids the deformation of the character fonts caused by mapping and perspective projection, as in the first embodiment.

Fifth Embodiment

The following is a description of a map display device 50 to which the fifth embodiment of the invention relates. The map display device 50 is a device that provides undulations according to altitudes to map information, perspective-projects the map information provided with the undulations onto a virtual screen having an intended curved surface form, projects an image obtained by the perspective projection onto a display screen, and displays it. By doing so, a map is displayed with a desired portion enlarged or contracted while maintaining connections of roads, and with a three-dimensional appearance. The same features as the first, second, and fourth embodiments are omitted, so that the following explanation focuses on the difference with these embodiments.

(Overall Construction)

Figure 31:
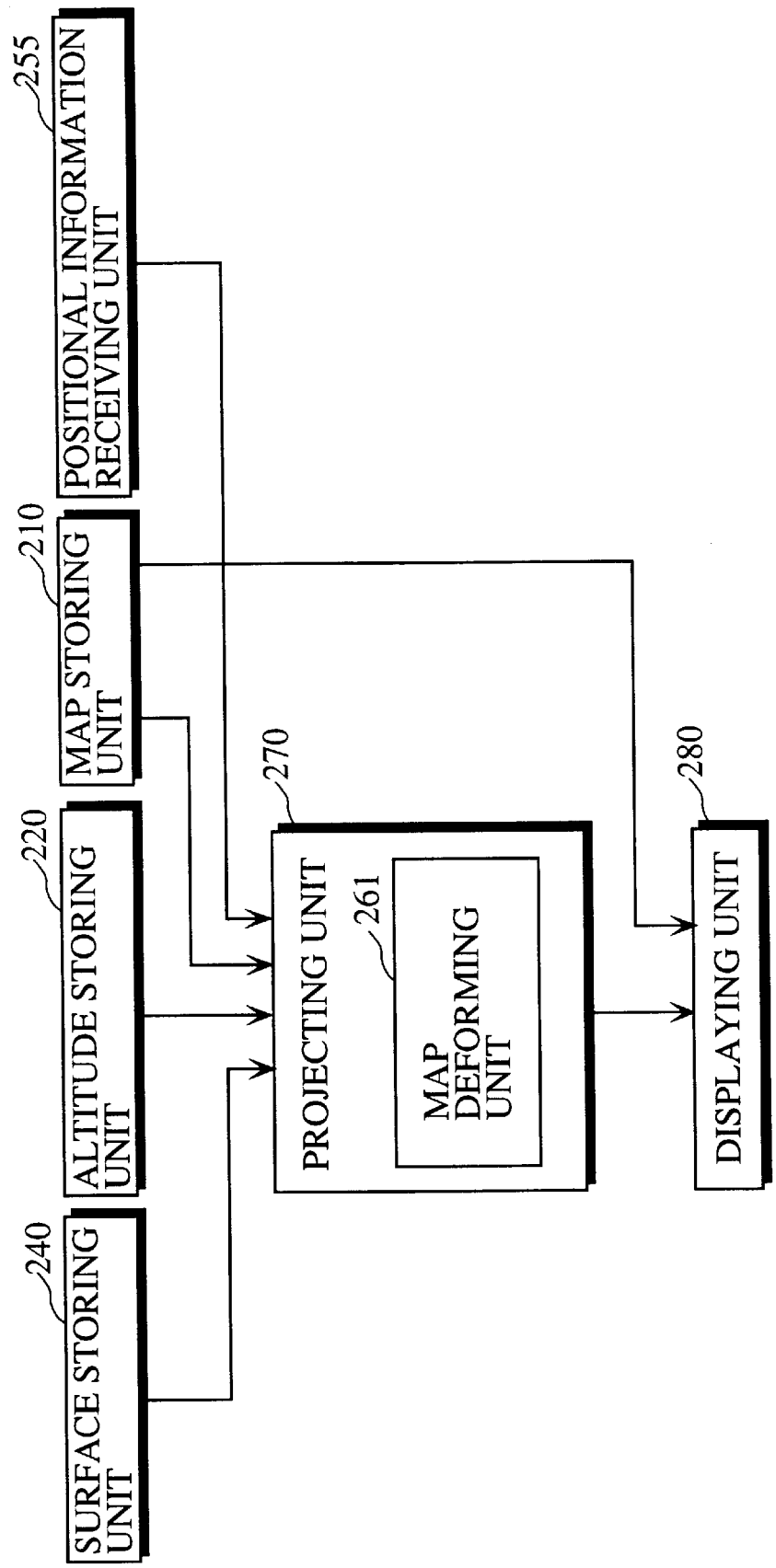
FIG. 31 is a block diagram showing a map display device according to the fifth embodiment of the invention.

As shown in FIG. 31, the map display device 50 includes the construction elements of the map display device 40 of the fourth embodiment, and further includes an altitude storing unit 220. Also, the projecting unit 270 includes a map deforming unit 261.

(Altitude Storing Unit 220)

The altitude storing unit 220 is the same as the altitude storing unit 120 in the second embodiment. The altitude storing unit 220 has the altitude table 121 shown in FIG. 15, and stores a position and an altitude for each altitude point.

(Map Deforming Unit 261)

The map deforming unit 261 is notified by the projecting unit 270 of the display target area and the transformation f, and provides undulations according to the altitude information to the image information included in the display target area, in the virtual space. The map deforming unit 261 then outputs the result to the projecting unit 270. The details are explained below.

For each altitude point included in the display target area, the map deforming unit 261 calculates a point (f(s0,t0),0) in the virtual space corresponding to a position (s0,t0) of the altitude point, and calculates a point (f(s0,t0),ah) by adding the result of multiplying an altitude h by a constant a, to the z coordinate. The map deforming unit 261 then notifies the projecting unit 270 of the calculated point, as a sample point which defines the deformed image information. Here, the constant a is a scale for altitudes in the xyz coordinate system, and also represents the degree of emphasis on undulations. In other words, the greater the value of a, the more emphasis is placed on the undulations.

Here, as in the second embodiment, the difference with the mean or minimum value of the altitude values included in the display target area may be set as h. Also, when a sample point for defining the deformed image information needs to be provided at a predetermined xy coordinate position but there is no altitude point at that position, the sample point may be calculated by interpolating altitude values of neighboring altitude points using bilinear interpolation or the like.

(Projecting Unit 270)

The projecting unit 270 calculates the display target area based on the car positional information received from the positional information receiving unit 255, and perspective-projects the deformed image information obtained by deforming the image information included in the display target area by the map deforming unit 261, onto the virtual screen whose form is defined by the surface information stored in the surface storing unit 240. The details are explained below.

The projecting unit 270 calculates the display target area and the transformation f, as in the fourth embodiment.

The projecting unit 270 notifies the map deforming unit 261 of the display target area and the transformation f, and instructs the map deforming unit 261 to provide undulations according to the altitude information to the image information included in the display target area, in the virtual space. The projecting unit 270 then acquires the deformed image information from the map deforming unit 261.

The projecting unit 270 perspective-projects the deformed image information, in the same way as in the fourth embodiment.

(Map Display Operation)

Figure 32:
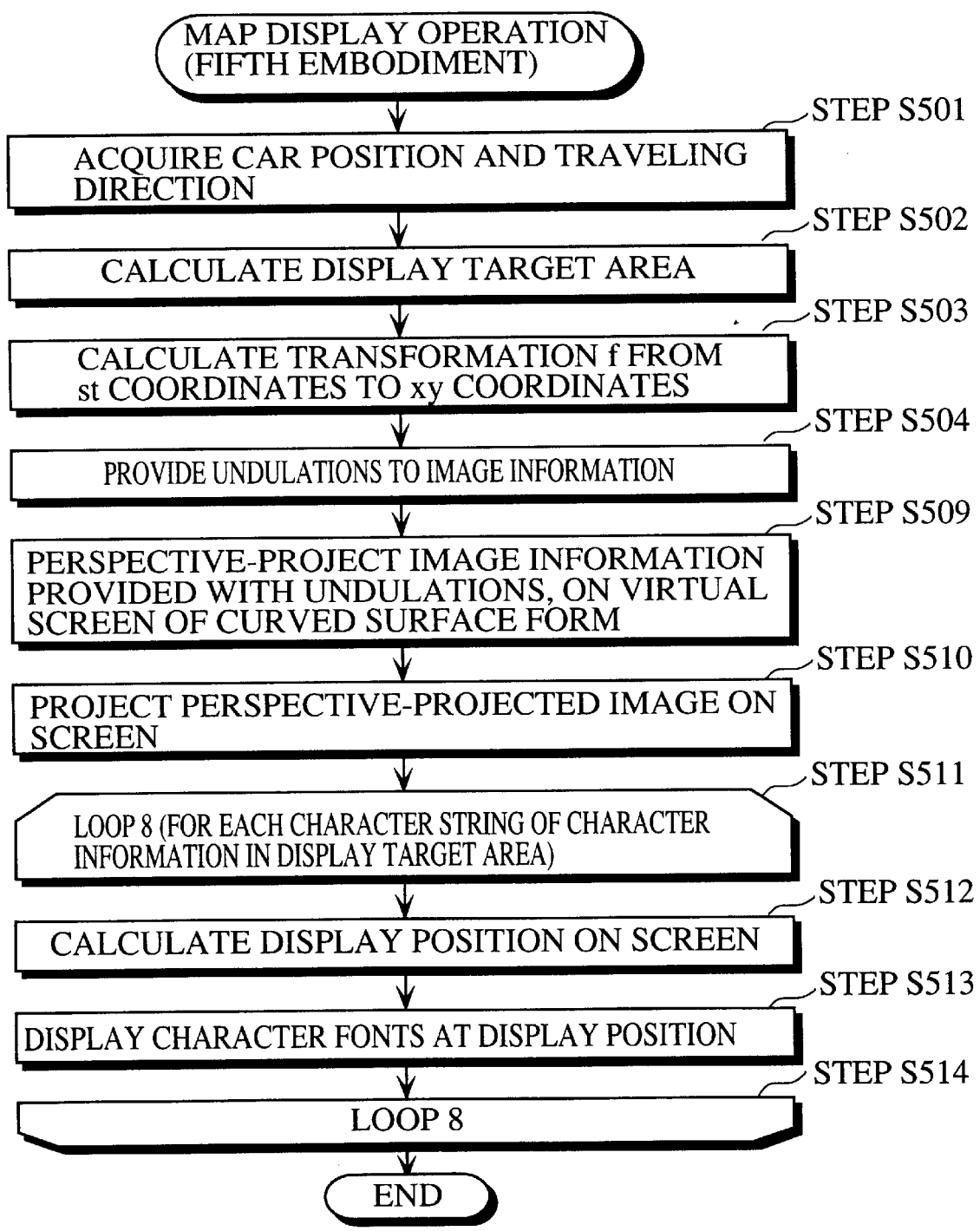
FIG. 32 is a flowchart showing a map display operation in the fifth embodiment.

A map display operation of the map display device 50 is explained below, with reference to FIG. 32.

The positional information receiving unit 255 outputs the car positional information showing the car position and the traveling direction, to the projecting unit 270 (S501). The projecting unit 270 calculates the display target area based on the car position and the traveling direction (S502), and calculates the transformation f from st coordinates to xy coordinates of the virtual space (S503).

The map deforming unit 261 provides undulations according to the altitude information to the image information included in the display target area, in the virtual space (S504).

The projecting unit 270 perspective-projects the image information provided with the undulations, onto the virtual screen defined by the surface information stored in the surface storing unit 240 (S509).

The displaying unit 280 projects and displays the image perspective-projected on the virtual screen, onto the display screen equipped therein (S510). Also, for each character string whose position is included in the display target area (S511), the displaying unit 280 calculates a display position on the display screen (S512), and displays character fonts of the character string at the display position (S513).

(Conclusion)

As described above, the map display device 50 provides the undulations according to the altitudes to the image information, perspective-projects the image information provided with the undulations onto the virtual screen which has the same form as that the fourth embodiment, projects the perspective-projected image onto the display screen, and displays it. As a result, a map can be displayed with a desired portion enlarged or contracted and with a three-dimensional appearance.

Also, the map display device 50 avoids the deformation of the character fonts caused by mapping and perspective projection, in the same manner as in the first embodiment.

Sixth Embodiment

The following is a description of a map display device 60 to which the sixth embodiment of the invention relates. The map display device 60 is a device that provides undulations according to altitudes to map information except the car position and its vicinity, perspective-projects the resulting map information onto a virtual screen having an intended curved surface form, and projects and displays an image obtained as a result of the perspective projection. In so doing, a map is displayed with a desired portion enlarged or contracted while maintaining connections of roads, and with a three-dimensional appearance. The map display device 60 further prevents the map display around the car position from being obstructed by the undulations. The same features as the first, third, and fifth embodiments are omitted, so that the following explanation focuses on the difference with these embodiments.

(Overall Construction)

Figure 33:
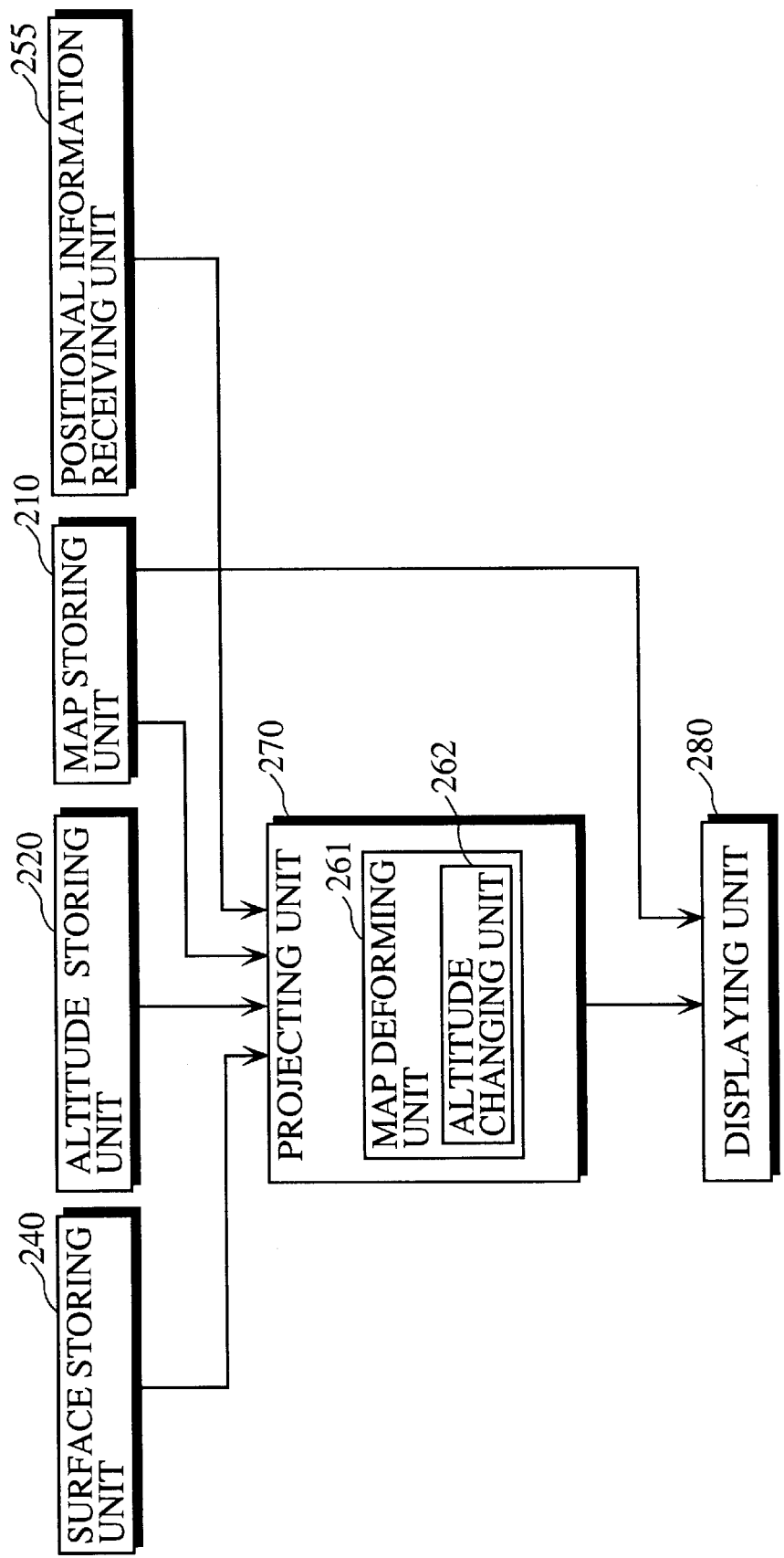
FIG. 33 is a block diagram showing a map display device according to the sixth embodiment of the invention.

As shown in FIG. 33, in the map display device 60 the map deforming unit 261 includes an altitude changing unit 262.

(Map Deforming Unit 261)

The map deforming unit 261 is notified by the projecting unit 270 of the display target area and the transformation f. The map deforming unit 261 provides undulations according to altitude information changed by the altitude changing unit 262, to the image information included in the display target area in the virtual space, in the same way as the fifth embodiment. The map deforming 11 unit 261 then outputs the result to the projecting unit 270.

(Altitude Changing Unit 262)

The altitude changing unit 262 is the same as the altitude changing unit 162 in the third embodiment. The altitude changing unit 262 sets a flat area which contains the car position and its vicinity, changes altitudes of altitudes points in the flat area to a uniform value, and changes altitudes of altitude points around the flat area according to their distances from the flat area.

(Map Display Operation)

Figure 34:
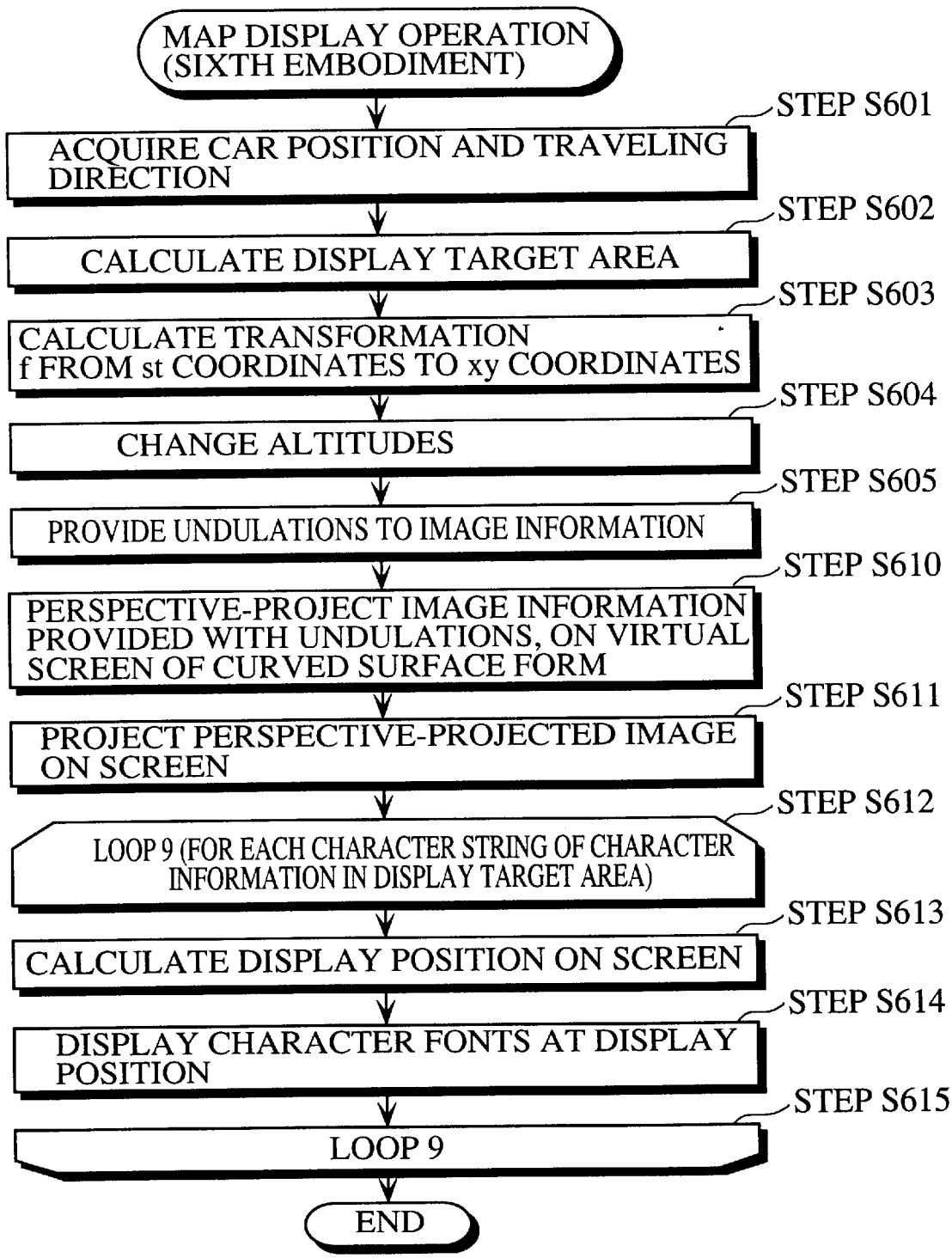
FIG. 34 is a flowchart showing a map display operation in the sixth embodiment.

A map display operation of the map display device 60 is explained below, with reference to FIG. 34.

The positional information receiving unit 255 outputs the car positional information showing the car position and the traveling direction, to the projecting unit 270 (S601). The projecting unit 270 calculates the display target area based on the car position and the traveling direction (S602), and calculates the transformation f from st coordinates to xy coordinates of the virtual space (S603)

The altitude changing unit 262 changes the altitudes of the altitude points in the flat area to the uniform value, and changes the altitudes of the altitude points around the flat area depending on their distances from the flat area (S604).

The map deforming unit 261 provides undulations according to the changed altitude information to the image information included in the display target area, in the virtual space (S605).

The projecting unit 270 perspective-projects the deformed image information onto the virtual screen defined by the surface information stored in the surface storing unit 240 (S610)

The displaying unit 280 projects and displays the image perspective-projected on the virtual screen, onto the display screen equipped therein (S611). Also, for each character string whose position is included in the display target area (S612), the displaying unit 280 calculates a display position on the display screen (S613), and displays character fonts of the character string at the display position (S614).

(Conclusion)

As described above, the map display device 60 provides the undulations corresponding to the altitudes to the image information except the car position and its vicinity, perspective-projects the image information provided with the undulations onto the virtual screen having the same curved surface form as in the fifth embodiment, and projects and displays the perspective-projected image onto the display screen. As a result, a map can be displayed with a desired portion enlarged or contracted and with a three-dimensional appearance. Also, the map display device 60 keeps the map display from being obstructed by the undulations, by restricting the display of the undulations around the car position.

Furthermore, the map display device 60 avoids the deformation of the character fonts caused by mapping and perspective projection, as in the first embodiment.

Modifications

Though the present invention has been described based on the above embodiments, the invention should not be limited to such. For example, the following modifications are applicable.

(1) The invention may be a method which includes the steps described in each embodiment. Also, the invention may be a computer program which implements the method using a computer system, or digital signals which make up such a program.

The invention may also be a computer-readable recording medium, such as a floppy disk, a hard disk, a CD-ROM, an MO, a DVD, a DVD-ROM, a DVD-RAM, or a semiconductor memory, which stores the above program or digital signals.

The invention may also be the above program or digital signals transmitted via a network such as a telecommunication line, a radio or cable transmission line, or the Internet.

The invention may also be a computer system equipped with a microprocessor and a memory which stores the above program, wherein the microprocessor operates according to the program in the memory to implement the above method.

Further, the above program or digital signals may be transported via the recording medium or the network, and implemented in another independent computer system.

(2) The curved surface stored in the surface storing units 140 and 240 is not limited to the examples shown in the above embodiments. For example, by using the plurality of sample points on the curved surface or the parameters u and v, a curved surface of a more complex form can be defined.

If a curved surface of an intended form is defined by using the plurality of sample points on the curved surface or the parameters u and v, not only the portions which are enlarged or contracted by the above embodied curved surfaces, but also other desired portions of the map can be enlarged and/or contracted.

(3) The first to third embodiments describe the case where the mapping unit 160 in the map display devices 10 to 30 maps the image information onto the curved surface according to the surface information stored in the surface storing unit 140, but each of the map display devices 10 to 30 may include a surface receiving unit for receiving the surface information from outside the device, and map the image information onto the curved surface according to the received information.

The fourth to sixth embodiments describe the case where the projecting unit 270 in the map display devices 40 to 60 perspective-projects the image information onto the virtual screen defined by the surface information stored in the surface storing unit 240, but each of the map display devices 40 to 60 may include a surface receiving unit for receiving the surface information from outside the device, and perspective-project the image information onto the virtual screen defined by the received information.

With these constructions, each map display device acquires the surface information calculated by a surface calculating device which is provided outside the map display device, and uses it for map display. Accordingly, in a case where a position of a point of interest changes in a complicated manner as a car moves, if the outside surface calculating device provides surface information for enlarging and/or contracting desired portions of a map to the map display device, the computational load is distributed over the two devices, so that the map display device can produce a map display more smoothly.

(4) The projecting unit 170 in the first embodiment may be provided with a projection position storing unit for storing combinations of coordinates. Such a projecting unit 170 calculates, in the virtual space, a point on the virtual screen to which each point on the curved surface is to be projected, in accordance with the form of the curved surface and the positional relationship between the curved surface, the virtual screen, and the eyepoint. The projecting unit 170 then stores the coordinates of both points in the projection position storing unit in combination, and performs the perspective projection according to the stored coordinates.

Also, the projecting unit 270 in the fourth embodiment may be provided with a projection position storing unit for storing combinations of coordinates. Such a projecting unit 270 calculates, in the virtual space, a point on the virtual screen to which each point in the image information is to be projected, in accordance with the form of the virtual screen and the positional relationship between the image information, the virtual screen, and the eyepoint. The projecting unit 270 then stores the coordinates of both points in the projection position storing unit in combination, and performs the perspective projection based on the stored coordinates.

In the first and fourth embodiments, the form of the curved surface or the image information in the virtual space is unchanged, as it is not provided with undulations according to altitudes. Which is to say, the correspondence between a point on the curved surface or the image information and a point on the virtual screen to which the point on the curved surface or the image information is to be projected is unchanged irrespective of any change in altitude caused by the movement of the car position. Therefore, by calculating and storing the projection positions in advance, it becomes unnecessary to perform, each time the car position changes, the calculation of the projection positions which requires large computational complexity. This increases the map display speed.

(5) The first to sixth embodiments describe the case where the displaying unit in the map display devices 10 to 60 directly displays the character fonts corresponding to the character string at a predetermined position, to keep the character fonts from being deformed by mapping and perspective projection. However, such a display method is not limited to the character information. For example, when a map contains a landmark graphics designating an object, the graphics may be directly displayed at a predetermined position of the displaying unit without being mapped or perspective-projected, with it being possible to prevent the deformation of the graphics and improve the viewability.

(6) In the first to sixth embodiments, each of the map display devices 10 to 60 may be provided with a map information receiving unit, so as to receive the map information transmitted by radio from outside the device, store the received map information in the map storing unit 110 or 210, and display it. In this case, in conjunction with a service which distributes by radio map information including the latest road conditions such as the closure and opening of roads, the map display device can receive the latest map information and display it at any time.

(7) The first to sixth embodiments describe the case where the mapping unit 160 or the projecting unit 270 calculates the display target area based on the car positional information, but it may receive an instruction from the driver and calculate the display target area in accordance with the driver instruction.

With this construction, the map display device ordinarily displays a map of an area specified by the current position of the car, and upon receiving an instruction from the driver, temporarily displays a map of the vicinity of a destination or the like. This benefits the convenience of drivers.

Although the present invention has been fully described by way of examples with reference to the accompanying drawings, it is to be noted that various changes and modifications will be apparent to those skilled in the art.

Therefore, unless such changes and modifications depart from the scope of the present invention, they should be construed as being included therein.

What is claimed is:

1. A map display device, comprising:

map storing means for storing map information;

map acquiring means for acquiring map information that shows the a map of an area specified by a current position of the map display device, from the map storing means, the map having a portion which is to be enlarged and/or a portion which is to be contracted, the portion to be enlarged and the portion to be contracted being referred to as an enlarged portion and a contracted portion respectively;

surface storing means for storing surface information that defines a curved surface whose form depends on a positioning of the enlarged portion and/or the contracted portion on the map shown by the acquired map information;

mapping means for mapping the map shown by the acquired map information, onto the curved surface defined by the surface information, to generate the a mapped image; and projecting/displaying means for projecting the mapped image onto a flat virtual screen, and displaying the projected image.

2. The map display device of claim 1, wherein the curved surface defined by the surface information has the following property:

when the map is mapped onto the curved surface by the mapping means and projected onto the virtual screen by the projecting/displaying means,
- (a) an angle formed between a part of the curved surface to which the enlarged portion of the map is mapped and a line of sight directed to the part of the curved surface in the projection is larger than any angles formed between other parts of the curved surface and lines of sight directed to the other parts of the curved surface in the projection, and
- (b) an angle formed between a part of the curved surface to which the contracted portion of the map is mapped and a line of sight directed to the part of the curved surface in the projection is smaller than any angles formed between other parts of the curved surface and lines of sight directed to the other parts of the curved surface in the projection.

3. The map display device of claim 2, further comprising altitude storing means for storing altitude information showing a correspondence between positions of points shown in the map and altitudes of the points,
the mapping means includes
a surface deforming unit for providing undulations corresponding to the altitudes shown by the altitude information, to the curved surface at positions to which the points on the map at the corresponding positions shown by the altitude information are to be mapped, to generate a deformed curved surface, and
the mapping means maps the map onto the deformed curved surface.

4. The map display device of claim 3,
wherein the surface deforming unit includes
an altitude changing unit for changing altitudes in the altitude information that correspond to positions included in a first area which is made up of the current position of the map display device in the map and a neighborhood thereof, to a uniform value, and
the surface deforming unit generates the deformed curved surface, using the changed altitude information.

5. The map display device of claim 4,
wherein the altitude changing unit further changes altitudes in the altitude information that correspond to positions included in an area around the first area, in accordance with distances of the positions from the first area.

6. The map display device of claim 1, further comprising surface receiving means for receiving the surface information,
wherein the surface storing means stores the surface information received by the surface receiving means.

7. The map display device of claim 1,
wherein the projecting/displaying means includes
a projection position storing unit for storing a correspondence between positions on the curved surface and positions on the virtual screen to which points at the positions on the curved surface are to be projected.

8. The map display device of claim 1,
wherein the map information stored in the map storing means includes (a) image information showing an image in which graphics representative of objects are drawn in correspondence with positions of the objects on the ground surface, and (b) character information showing a correspondence between character strings relating to the objects and the positions of the objects on the ground surface,
the map acquiring means acquires image information and character information which relate to the map of the area specified by the current position of the map display device, from the map storing means,
the map display device further comprises
character display position calculating means for calculating points on the curved surface to which points on the map at positions shown by the acquired character information are mapped, and calculating positions on the virtual screen to which the calculated points on the curved surface are projected,
the mapping means maps an image shown by the acquired image information, to generate the mapped image, and
the projecting/displaying means further displays character strings shown by the acquired character information, with reference to the calculated positions.

9. The map display device of claim 1 being mounted on a movable body, and further comprising
positional information receiving means for receiving positional information showing a current position and a traveling direction of the movable body,
wherein the map acquiring means acquires the map information showing the map of the area specified by the positional information received by the positional information receiving means, from the map storing means.

10. The map display device of claim 9, further comprising map receiving means for receiving map information transmitted by radio,
wherein the map storing means stores the map information received by the map receiving means.

11. A map display device, comprising:
map storing means for storing map information;
map acquiring means for acquiring map information that shows a map of an area specified by a current position of the map display device, from the map storing means, the map having a portion which is to be enlarged and/or a portion which is to be contracted, the portion to be enlarged and the portion to be contracted being referred to as an enlarged portion and a contracted portion respectively;
surface storing means for storing surface information that defines a virtual screen having a form of a curved surface which depends on a positioning of the enlarged portion and/or the contracted portion on the map shown by the acquired map information; and
projecting/displaying means for projecting the map shown by the acquired map information onto the virtual screen defined by the surface information, and displaying a projected image obtained as a result of the projection.

12. The map display device of claim 11,
wherein the virtual screen defined by the surface information has the following property:
when the map is projected onto the virtual screen by the projecting/displaying means,
- (a) an angle formed between a part of the virtual screen to which the enlarged portion of the map is projected and a line of sight directed to the part of the virtual screen in the projection is smaller than any angles formed between other parts of the virtual screen and lines of sight directed to the other parts of the virtual screen in the projection, and
- (b) an angle formed between a part of the virtual screen to which the contracted portion of the map is projected and a line of sight directed to the part of the virtual screen in the projection is larger than any angles formed between other parts of the virtual screen and lines of sight directed to the other parts of the virtual screen in the projection.

13. The map display device of claim 12, further comprising altitude storing means for storing altitude information showing a correspondence between positions of points shown in the map and altitudes of the points, the projecting/displaying means includes a map deforming unit for providing undulations corresponding to the altitudes shown by the altitude information, to the map at the corresponding positions shown by the altitude information, to generate a deformed map, and the projecting/displaying means projects the deformed map onto the virtual screen.

14. The map display device of claim 13, wherein the map deforming unit includes an altitude changing unit for changing altitudes in the altitude information that correspond to positions included in a first area which is made up of the current position of the map display device in the map and a neighborhood thereof, to a uniform value, and the map deforming unit generates the deformed map, using the changed altitude information.

15. The map display device of claim 14, wherein the altitude changing unit further changes altitudes in the altitude information that correspond to positions included in an area around the first area, in accordance with distances of the positions from the first area.

16. The map display device of claim 11, further comprising surface receiving means for receiving the surface information, wherein the surface storing means stores the surface information received by the surface receiving means.

17. The map display device of claim 11, wherein the projecting/displaying means includes a projection position storing unit for storing a correspondence between positions on the map and positions on the virtual screen to which points at the positions on the map are to be projected.

18. The map display device of claim 11, wherein the map information stored in the map storing means includes (a) image information showing an image in which graphics representative of objects are drawn in correspondence with positions of the objects on the ground surface, and (b) character information showing a correspondence between character strings relating to the objects and the positions of the objects on the ground surface, the map acquiring means acquires image information and character information which relate to the map of the area specified by the current position of the map display device, from the map storing means, the map display device further comprises character display position calculating means for calculating positions on the virtual screen to which points on the map at positions shown by the acquired character information are to be projected, and the projecting/displaying means projects an image shown by the acquired image information, to generate the projected image, and displays character strings shown by the acquired character information, with reference to the calculated positions.

19. The map display device of claim 11 being mounted on a movable body, and further comprising positional information receiving means for receiving positional information showing a current position and a traveling direction of the movable body, wherein the map acquiring means acquires the map information showing the map of the area specified by the positional information received by the positional information receiving means, from the map storing means.

20. The map display device of claim 19, further comprising map receiving means for receiving map information transmitted by radio, wherein the map storing means stores the map information received by the map receiving means.

21. A map display method for use in a map display device for displaying a map with one or more portions enlarged and/or contracted, comprising:

a map receiving step for receiving map information that shows a map of an area specified by a current position of the map display device, wherein surface information that defines a curved surface whose form depends on a positioning of one or more portions to be enlarged and/or contracted on the map shown by the map information is stored in a storing unit in the map display device;

a mapping step for mapping the map shown by the map information, onto the curved surface defined by the surface information, to generate a mapped image; and a projecting/displaying step for projecting the mapped image onto a flat virtual screen, and displaying the projected image.

22. A map display method for use in a map display device for displaying a map with one or more portions enlarged and/or contracted, comprising:

a map receiving step for receiving map information that shows a map of an area specified by a current position of the map display device, wherein surface information that defines a virtual screen having a form of a curved surface which depends on a positioning of one or more portions to be enlarged and/or contracted on the map shown by the map information is stored in a storing unit in the map display device; and a projecting/displaying step for projecting the map shown by the map information onto the virtual screen defined by the surface information, and displaying a projected image obtained as a result of the projection.

23. A computer program recorded on a computer-readable recording medium, for use in a map display device that displays a map with one or more portions enlarged and/or contracted, the program comprising:

a map receiving step for receiving map information that shows a map of an area specified by a current position of the map display device, wherein surface information that defines a curved surface whose form depends on a positioning of one or more portions to be enlarged and/or contracted on the map shown by the map information is stored in a storing unit in the map display device;

a mapping step for mapping the map shown by the map information, onto the curved surface defined by the surface information, to generate a mapped image; and a projecting/displaying step for projecting the mapped image onto a flat virtual screen, and displaying the projected image.

24. A computer program recorded on a computer-readable recording medium, for use in a map display device that displays a map with one or more portions enlarged and/or contracted, the program comprising:

a map receiving step for receiving map information that shows a map of an area specified by a current position of the map display device, wherein surface information that defines a virtual screen having a form of a curved surface which depends on a positioning of one or more portions to be enlarged and/or contracted on the map shown by the map information is stored in a storing unit in the map display device; and a projecting/displaying step for projecting the map shown by the map information onto the virtual screen defined by the surface information, and displaying a projected image obtained as a result of the projection.

* * * * *